United States Patent [19]
Hashimoto

[11] Patent Number: 6,161,511
[45] Date of Patent: Dec. 19, 2000

[54] INTAKE/EXHAUST VALVE OPEN/CLOSE TIMING CONTROL SYSTEM FOR INTERNAL COMBUSTION ENGINE

[75] Inventor: Takeshi Hashimoto, Hyogo, Japan

[73] Assignee: Mitsubishi Denki Kabushiki Kaisha, Tokyo, Japan

[21] Appl. No.: 09/417,111

[22] Filed: Oct. 13, 1999

[30] Foreign Application Priority Data

Apr. 26, 1999 [JP] Japan ................................ 11-118052

[51] Int. Cl.[7] .............................. F02D 13/02; F01L 1/34
[52] U.S. Cl. ..................................... 123/90.15; 123/90.17
[58] Field of Search ............................ 123/90.15, 90.16, 123/90.17, 90.31

[56] References Cited

U.S. PATENT DOCUMENTS

| | | | |
|---|---|---|---|
| 5,562,071 | 10/1996 | Urushihata et al. ................. | 123/90.15 |
| 5,623,896 | 4/1997 | Kato et al. ............................ | 123/90.15 |
| 5,626,108 | 5/1997 | Kato et al. ............................ | 123/90.15 |
| 5,626,109 | 5/1997 | Yasumura et al. ................... | 123/90.15 |
| 5,628,286 | 5/1997 | Kato et al. ............................ | 123/90.15 |
| 5,937,808 | 8/1999 | Kako et al. ............................ | 123/90.15 |

FOREIGN PATENT DOCUMENTS 6-299876  10/1994  Japan .

*Primary Examiner*—Weilun Lo
*Attorney, Agent, or Firm*—Sughrue, Mion, Zinn, Macpeak & Seas, PLLC

[57] ABSTRACT

A valve timing control system for an internal combustion engine which is capable of making an actual intake/exhaust valve timing resume speedily rapidly to a desired valve timing with high accuracy to thereby prevent degradation of exhaust gas quality includes a desired valve timing arithmetic means (202) for determining desired valve timings (To) for an intake valve (17) and an exhaust valve (18), respectively, in dependence on an engine operation state (D), a variable valve timing mechanism (40) for changing open/close timings of the valves (17, 18), respectively, an actual valve timing detecting means (203) for detecting actual valve timings (Ta), respectively, of the valves (17, 18), an actual valve timing control means (204) for generating a control quantity (i) for the variable valve timing mechanism (40), and a learning means (206) for learning a most retarded valve timing as a learned value (LRN). The detected value of the actual valve timing (Ta) which is detected at a timing retarded more than the timing indicated by the learned value (LRN) is reflected in the learned value (LRN) in the course of operation of the engine (1).

18 Claims, 23 Drawing Sheets

INTAKE/EXHAUST VALVE OPEN/CLOSE TIMING CONTROL SYSTEM FOR INTERNAL COMBUSTION ENGINE

BACKGROUND OF THE INVENTION

1. Field of the Invention

The present invention relates generally to a valve timing control system for regulating or controlling valve open/close timing (also referred to simply as the valve timing) at which an intake valve and/or an exhaust valve of an internal combustion engine is opened and closed in dependence on operating state or condition of the engine. More particularly, the invention is concerned with a valve timing control system for controlling the actually detected valve timing so that it can converge rapidly or speedily to a desired valve by learning most retarded timing to be used as reference values for the control over a wide operation range of the engine while invalidating speedily information or data learned erroneously, to thereby prevent the quality of engine exhaust gas from deterioration.

2. Description of Related Art

In the technical field of the internal combustion engine, there has heretofore been well known a system for controlling variably the operation timing for at least one of an intake valve and an exhaust valve of the engine in dependence on the operation state thereof with a view to enhancing efficiency of intake and discharge operations of the engine cylinders.

In such control system, learned values (most retarded valve open/close timing indicative of angular position of the engine crank shaft serving as a reference for the control) in which dispersion among the products brought about in manufacturing the same has been canceled out are previously stored in a memory or a storage, for thereby allowing the valve open/close timing (control quantity) to be arithmetically determined in dependence on various operation states of the engine on the basis of the learned values. In other words, the learned values are always used in the valve open/close timing control. Thus, it is required that the learned values be determined to be optimal.

Typical ones of the hitherto known or conventional control system of the type mentioned above are disclosed, for instance, in Japanese Unexamined Patent Application Publications Nos. 299876/1994 (JP-A-6-299876) and 345264/1997 (JP-A-9-345264), respectively. For having better understanding of the concept underlying the present invention, description will first be made in some detail of a conventional valve timing control system for an internal combustion engine by reference to FIGS. 15 to 28.

FIG. 15 is a schematic diagram showing generally a configuration of a gasoline engine system equipped with a conventional valve open/close timing regulating mechanism. Referring to the figure, an internal combustion engine (hereinafter also referred to simply as the engine) denoted generally by reference numeral 1 constitutes a major part of the gasoline engine system and includes a plurality of cylinders (e.g. four cylinders). In FIG. 15, however, only one cylinder and associated components are illustrated representatively.

As is shown in FIG. 15, a cylinder block 2 forms a cylinder portion of the engine 1. A cylinder head 3 is connected to the cylinder block 2 at a top end thereof. A piston 4 is housed within each of cylinder chambers formed in the cylinder block 2 so as to move reciprocatively in the vertical direction. A crank shaft 5 is operatively coupled to the piston 4 at a bottom end thereof and caused to rotate in unison with the reciprocative motion of the piston 4.

A crank angle sensor 6 is disposed in the vicinity of the crank shaft 5. This sensor 6 may be constituted, for example, by an electromagnetic pickup or sensor designed for generating a crank angle signal SGT in synchronism with revolution of the engine 1. The crank angle signal SGT is utilized not only for detecting the engine speed or rotation number NE (rpm) of the engine 1 but also for detecting a predetermined reference crank angle (° CA) of the crank shaft 5.

A signal rotor 7 is integrally mounted on the crank shaft 5 and has an outer peripheral surface formed with a pair of teeth 7a with an angular distance of 180° therebetween. The teeth 7a are formed of a magnetic material. Thus, upon every passing of each tooth 7a in front of the crank angle sensor 6, the crank angle signal SGT of a pulse-like form is generated by the crank angle sensor 6.

A combustion chamber 8 is defined by the inner wall of the cylinder block 2 and those of the cylinder head 3 and a top wall of the piston 4. Air-fuel mixture charged into the engine 1 undergoes combustion within the combustion chamber 8. To this end, a spark plug 9 is disposed at the top of the cylinder head 3 so as to partially project into the combustion chamber 8. The air-fuel mixture is fired by electric discharge taking place at the spark plug 9.

A distributor 10 is installed, being operatively coupled to an exhaust-side cam shaft 20 (described hereinafter) which is mounted on the cylinder head 3. The distributor 10 is designed for applying a high firing voltage sequentially to the spark plugs 9 provided in the individual cylinders, respectively. An ignitor 11 is provided for generating the high ignition voltage.

More specifically, each of the spark plugs 9 is electrically connected to the distributor 10 by way of a high-voltage rated cord (not shown), wherein the high voltage outputted from the ignitor 11 is distributed to the individual spark plugs 9, respectively, by the distributor 10 in synchronism with the rotation of the crank shaft 5.

Further installed in association with the cylinder block 2 is a water temperature sensor 12 which serves for detecting the temperature W of cooling water flowing through a coolant passage. An intake port 13 is provided at an intake side of the cylinder head 3 while an exhaust port 14 is disposed at an exhaust side of the cylinder head 3. An intake passage 15 is communicated to the intake port 13 with an exhaust passage 16 being communicated to the exhaust port 14. An intake valve 17 is disposed in the intake port 13 of the cylinder head 3 while an exhaust valve 18 is installed in the exhaust port 14 formed in the cylinder head 3.

An intake-side cam shaft 19 is disposed above the intake valve 17 for driving the intake valve 17 to open and close the same. Similarly, the exhaust-side cam shaft 20 is disposed above the exhaust valve 18 for opening and closing the same.

An intake timing pulley 21 is mounted on the intake-side cam shaft 19 at one end thereof, while an exhaust timing pulley 22 is mounted on the exhaust-side cam shaft 20 at one end thereof. The intake timing pulley 21 and the exhaust timing pulley 22 are operatively coupled to the crank shaft 5 by means of a timing belt 23 so that each of the cam shafts 19 and 20 can rotate at a speed equal to a half of the rotation speed (rpm) of the crank shaft 5.

When the engine 1 is in the operating state, the driving torque of the crank shaft 5 is transmitted to the cam shafts 19 and 20, respectively, by way of the timing belt 23 and the timing pulleys 21 and 22 to thereby rotate the cam shafts 19 and 20, respectively.

Thus, the intake valve 17 and the exhaust valve 18 are driven, respectively, to the open/close states in synchronism with the rotation of the crank shaft 5 and hence the reciprocative motion of the piston 4. In other words, each of the intake valve 17 and the exhaust valve 18 is driven with a predetermined open/close timing in synchronism with a series of four strokes, i.e., the suction stroke, compression stroke, explosion (expansion) stroke and the exhaust stroke of the engine 1.

A cam angle sensor 24 is disposed in the vicinity of the intake-side cam shaft 19 and designed to generate a cam angle signal SGC for detecting the actuation timing (i.e., valve timing) of the intake valve 17.

A signal rotor 25 is integrally mounted on the intake-side cam shaft 19, wherein the outer peripheral surface of the signal rotor 25 is formed with four teeth 25a at an angular distance of 90° therebetween. Each of the teeth 25a is formed of a magnetic material. Every time each of the teeth 25a passes in front of the cam angle sensor 24, a pulse-like cam angle signal SGC is generated by the cam angle sensor 24.

A throttle valve 26 is installed in the intake passage 15 at an intermediate portion thereof and adapted to be selectively opened or closed in response to actuation of an accelerator pedal (not shown), whereby the air-flow quantity (intake air flow) Q fed to the engine 1 is regulated. To this end, a throttle sensor 27 is operatively coupled to the throttle valve 26 for detecting the throttle opening degree θ.

An intake air-flow sensor 28 is disposed at a location upstream of the throttle valve 26 for detecting the intake air flow Q in the intake passage 15 by resorting to, for example, thermal detection technique which per se is known in the art. Further, a surge tank 29 is installed at a location downstream of the throttle valve 26 for suppressing pulsation of the intake air flow Q.

A fuel injector 30 is mounted in the vicinity of the intake port 13 of each of the individual cylinders, respectively, for injecting fuel for charging the air-fuel mixture into the combustion chamber 8. Each of the fuel injectors 30 is ordinarily constituted by an electromagnetic valve which is opened upon electric energization thereof. Fuel is fed to each of the fuel injectors 30 under pressure from a fuel pump (not shown).

In operation of the engine 1, air is taken into the intake passage 15 while the fuel injector 30 injects the fuel in the direction toward the intake port 13. As a result of this, air-fuel mixture is produced in the intake port 13 to be sucked into the combustion chamber 8 through the intake valve 17 which is adapted to open in the suction stroke.

A variable valve timing mechanism (VVT) 40 is operatively coupled to the intake-side cam shaft 19 and designed to be driven hydraulically (by using lubricant oil of the engine 1) for changing or modifying the valve operation timing of the intake valve 17 (or at least one of the intake valve 17 and the exhaust valve 18). More specifically, the variable valve timing mechanism 40 is so designed as to regulate or change the valve operation timing of the intake valve 17 continuously by changing the angle of displacement of the intake-side cam shaft 19 relative to the intake timing pulley 21. To this end, an oil control valve (OCV) 80 is provided for supplying working oil to the variable valve timing mechanism 40 as well as for adjusting the amount of the working oil.

For the purpose of realizing overall control of the engine operation, there is provided an electronic control unit (hereinafter also referred to as the ECU) 100 for controlling operations of the various actuators such as the fuel injector 30, the ignitor 11, the oil control valve 80 and others for controlling the fuel injection quantity, the ignition timing, the valve operation timing and others on the basis of the output signals of the various sensors such as the signals indicating the intake air flow Q, the cooling water temperature W, the crank angle signal SGT, the cam angle signal SGC and others which represent the operation state of the engine. The electronic control unit 100 may be constituted by a microcomputer or microprocessor, as will be described later on.

Next, description is directed to a structure of a variable valve timing system including the variable valve timing mechanism 40 and the oil control valve 80 by reference to FIGS. 16 to 24. FIG. 16 is a side elevational view showing partially in section a structural arrangement around the intake-side cam shaft 19 provided in association with the variable valve timing mechanism 40. Further, this figure also shows a structure of the working oil supply means inclusive of the oil control valve 80 for driving the variable valve timing mechanism 40. Parenthetically, in FIG. 16, the components same as or equivalent to those described previously are denoted by like reference characters.

Referring to FIG. 16, the variable valve timing mechanism 40 serves to regulate or adjust the intake valve operation timing, while the oil control valve 80 controls the amount of working oil supplied to the variable valve timing mechanism 40. The intake timing pulley 21 rotates in synchronism with the crank shaft 5 through the medium of the timing belt 23 which moves in unison with the rotation of the crank shaft 5.

Transmitted translationally to the intake-side cam shaft 19 is the rotation of the intake timing pulley 21 with modified phase due to intervention of the variable valve timing mechanism 40.

A bearing 41 is fixedly mounted on the cylinder head 3 (see FIG. 15) for supporting rotatably the intake-side cam shaft 19.

A first oil passage 42 and a second oil passage 43 are provided in association with the intake-side cam shaft 19 and a rotor 52 (described hereinafter), respectively. The first oil passage 42 is communicated to a retarding hydraulic chamber 62 (also described hereinafter) for displacing angularly the rotor 52 in the retarding direction while the second oil passage 43 is communicated to an advancing hydraulic chamber 63 (also described hereinafter) for displacing angularly the rotor 52 in the advancing direction.

There is further provided an oil pump 91 for taking out the working oil (lubricating oil) from an oil pan 90 containing the working oil (lubricant). Additionally, an oil filter 92 is provided for purifying the working oil taken out from the oil pan 90. The oil pan 90, the oil pump 91 and the oil filter 92 cooperate to constitute the lubricating means for lubricating various parts or components of the engine 1 (see FIG. 15) and at the same time constitute a working oil supply means for the variable valve timing mechanism 40 in cooperation with the oil control valve 80.

A variety of sensors designated generally and collectively by reference numeral 99 includes the sensors such as the crank angle sensor 6 mentioned previously and others provided in association with the engine 1, wherein output signals of these sensors indicating various operation state information of the engine 1 are inputted to the electronic control unit 100.

A spool valve element 82 is mounted within the housing 81 of the oil control valve 80 to move slideably therein. A linear solenoid 83 controls the spool valve element 82 in accordance with a corresponding control signal supplied from the electronic control unit 100. A spring 84 is provided for urging resiliently the spool valve element 82 in the direction opposite to the driving direction of the linear solenoid 83.

The housing 81 is provided with various ports 85 to 87, 88a and 88b.

The oil supplying port 85 is hydraulically communicated to the oil pump 91 by way of the oil filter 92, wherein an A-port 86 is hydraulically communicated to the first oil passage 42 with a B-port 87 being communicated to the second oil passage 43. On the other hand, the exhaust ports 88a and 88b are hydraulically communicated to the oil pan 90.

When the engine 1 is operating, the working oil is discharged from the oil pan 90 by the oil pump 91 which is put into operation upon rotation of the crank shaft 5. The working oil as discharged is fed under pressure selectively to the first oil passage 42 or the second oil passage 43 by way of the oil filter 92 and the oil control valve 80.

The flow rate of oil in each of the first and second oil passages 42 and 43 is increased or decreased consecutively as the opening degrees of the ports 86 and 87 are changed due to sliding movement of the spool valve element 82. In this conjunction, it is noted that the opening degrees of the A-port 86 and the B-port 87 are determined, respectively, in dependence on the magnitude or value of the control current i (control quantity of the linear solenoid current) supplied to the linear solenoid 83. Hereinafter, this current will also be referred to as the linear solenoid current i.

The electronic control unit 100 controls the control current i on the basis of the signals outputted from the various sensors such as the crank angle sensor 6, the cam angle sensor 24 and others.

A housing 44 of the variable valve timing mechanism 40 is mounted rotatably relative to the intake-side cam shaft 19, wherein a casing 45 is fixedly secured to the housing 44. A back spring 46 which may be constituted by a leaf spring is disposed between a tip seal 49 (described hereinafter) and the casing 45 to resiliently urge the tip seal 49 against the rotor 52 (also described hereinafter).

A cover 47 is secured to the casing 45 by means of bolts 48 which secure the housing 44, the casing 45 and the cover 47 to one another. The tip seal 49 is pressed against the rotor 52 by means of the back spring 46 to thereby prevent flow of working oil between the hydraulic chambers partitioned from each other by the rotor 52 and the casing 45. A plate 50 is secured to the cover 47 by means of a screw 51.

The rotor 52 is fixedly mounted on the intake-side cam shaft 19 and disposed rotatably relatively to the casing 45. The rotor 52 is provided with a cylindrical holder 53 having a recess which is adapted to engage with a plunger 54 (described hereinafter).

The plunger 54 provided with a protrusion is adapted to move slideably within the housing 44 under the influence of resiliency of a spring 55 (described hereinafter) and a hydraulic pressure of the oil introduced into the holder 53. The spring 55 exerts a spring force for urging the plunger 54 toward the rotor 52. A plunger oil passage 56 feeds the working oil in the direction for applying the hydraulic pressure to the plunger 54 against the spring force of the spring 55. An air passage 57 is provided for setting constantly to the atmospheric pressure the space formed at the side of the plunger 54 at which the spring 55 is disposed.

The intake-side cam shaft 19 and the rotor 52 are connected fixedly to each other by means of a connecting bolt 58. On the other hand, the intake-side cam shaft 19 and the rotor 52 are interconnected by a rotatable shaft portion of a shaft member 59 which is mounted rotatably relative to the cover 47. An air passage 60 is formed so as to extend internally through the shaft member 59 and the intake-side cam shaft 19 for setting the inner space defined by the plate 50 to the atmospheric pressure.

FIG. 17 is a fragmentary sectional view showing a state in which a hydraulic pressure is applied to the plunger 54 by way of the plunger oil passage 56.

As can be seen in FIG. 17, the plunger 54 is forced to bear against the housing 44 with the spring 55 being compressed under the hydraulic pressure. As a result of this, the plunger 54 and the holder 53 are disengaged from each other to thereby allow the rotor 52 to rotate relative to the housing 44.

FIG. 18 is a sectional view taken along a line X—X in FIG. 16 as viewed in the direction indicated by arrows, FIG. 19 is a fragmentary sectional view for illustrating displacement of a slide plate 71, FIG. 20 is a sectional view taken along a line Y—Y in FIG. 16 as viewed in the direction indicated by arrows, and FIG. 21 is a sectional view taken along a line Z—Z in FIG. 16 as viewed in the direction indicated by arrows.

Referring to FIGS. 18 to 21, the bolts 48 are received screwwise in the bolt holes 61, respectively. There are provided sector-like retarding hydraulic chambers 62 for rotating first to fourth vanes 64 to 67, respectively, in a retarding direction, as described hereinafter. Parenthetically, these vanes 64 to 67 are formed integrally with the rotor 52.

Each of the retarding hydraulic chambers 62 is defined as enclosed by the rotor 52, the casing 45, the cover 47 and the housing 44 in correspondence to the first to fourth vanes 64 to 67, respectively. Further, the retarding hydraulic chambers 62 are hydraulically communicated with the first oil passage 42, being supplied with working oil from the first oil passage 42.

On the other hand, there are provided sector-like advancing hydraulic chambers 63 for rotating the first to fourth vanes 64 to 67 in an advancing direction. Each of the advancing hydraulic chamber 63 is defined, being enclosed by the rotor 52, the casing 45, the cover 47 and the housing 44 in correspondence to the first to fourth vanes 64 to 67, respectively. Further, the advancing hydraulic chambers 63 are hydraulically communicated with the second oil passage 43, being supplied with the working oil from the second oil passage 43.

With the arrangement described above, the rotor 52 is displaced relative to the housing 44 in dependence on the amount of the working oil supplied to the retarding hydraulic chamber 62 and the advancing hydraulic chamber 63, whereby volumes of the retarding hydraulic chamber 62 and the advancing hydraulic chamber 63 are caused to change correspondingly.

The first vane 64 protrudes radially outwardly from the rotor 52. The holder 53 is fitted to the first vane 64 at the side facing the housing 44 with a communicating oil passage 70 (described hereinafter) being formed in the cover 47. A guide groove 72 (described hereinafter) is formed in an intermediate portion of each of the communicating oil passages 70. The plunger oil passage 56 extends through the holder 53 from a guide groove 72 to the housing 44.

Similarly, each of the second to fourth vanes 65 to 67 is so formed as to protrude from the rotor 52 outwardly in the radial direction. Further, a tip seal 73 (described hereinafter) is provided in a portion of each of the first to fourth vanes 64 to 67, which seal is brought into contact with the casing 45.

A vane supporting member 68 constitutes a center portion of the rotor 52. Shoes 69 are provided so as to protrude from the casing 45 inwardly in the radial direction. Each of the shoes 69 is provided with a bolt hole 61 for receiving the bolt 48 with the tip seal 49 being provided at a portion of the shoe 69 where the seal is brought into contact with the vane supporting member 68.

The communicating oil passage 70 is communicated with the retarding hydraulic chamber 62 and the advancing hydraulic chamber 63 formed at both sides of the first vane 64, respectively. The slide plate 71 is movable within the guide groove 72 (described hereinafter) formed in an intermediate portion of the communicating oil passage 70. The communicating oil passage 70 is divided or partitioned by the slide plate 71 so that no oil leakage can take place between the retarding hydraulic chamber 62 and the advancing hydraulic chamber 63.

With the arrangement described above, the slide plate 71 is caused to displace toward the advancing hydraulic chamber 63 when the hydraulic pressure within the retarding hydraulic chamber 62 is high (see FIG. 18). On the other hand, when the hydraulic pressure within the advancing hydraulic chamber 63 is high, the slide plate 71 is forced to move toward the retarding hydraulic chamber 62 (see FIG. 19).

As mentioned previously, the guide groove 72 is provided at an intermediate portion of the communicating oil passage 70, wherein an intermediate portion of the guide groove 72 is communicated to the plunger oil passage 56.

Thus, when the slide plate 71 moves toward the advancing hydraulic chamber 63 (see FIG. 18), the plunger oil passage 56 communicates with the retarding hydraulic chamber 62. Similarly, when the slide plate 71 moves toward the retarding hydraulic chamber 62 (see FIG. 19), the plunger oil passage 56 is set to the state communicating with the advancing hydraulic chamber 63.

The tip seal 73 is provided for each of the first to fourth vanes 64 to 67 for preventing occurrence of leakage of oil between the vanes and the casing 45. Parenthetically, arrows shown in FIGS. 18, 20 and 21 indicate the direction in which the variable valve timing mechanism 40 as a whole is rotated by means of the timing belt 23 and others.

Next, operations of the variable valve timing mechanism 40 and the oil control valve 80 will be described in the concrete.

At first, in the state in which the operation of the engine 1 is stopped, the rotor 52 assumes a most retarded position (i.e., the position at which the rotor 52 has been rotated to maximum relative to the housing 44 in the retarding direction), as is shown in FIG. 18.

In the state mentioned above, the hydraulic pressure of oil fed from the oil pump 91 to the oil control valve 80 is low (e.g. at the atmospheric pressure). Consequently, oil is supplied to neither the first oil passage 42 nor the second oil passage 43. Thus, no hydraulic pressure is applied to the plunger oil passage 56. As a result of this, the plunger 54 is resiliently pressed against the holder 53 under the force of the spring 55, as is shown in FIG. 16. In other words, the plunger 54 and the holder 53 engage with each other.

Upon starting of operation of the engine 1, the oil pump 91 is put into operation, whereby the hydraulic pressure supplied to the oil control valve 80 rises up. Consequently, hydraulic medium or oil is fed to the retarding hydraulic chamber 62 by way of the A-port 86. As a result of this, the slide plate 71 is caused to move toward the advancing hydraulic chamber 63 under the hydraulic pressure prevailing within the retarding hydraulic chamber 62, whereby hydraulic communication is established between the retarding hydraulic chamber 62 and the plunger oil passage 56. Thus, the plunger 54 is urged to displace toward the housing 44, which brings about disengagement between the plunger 54 and the rotor 52.

However, because the hydraulic pressure is applied to the advancing hydraulic chamber 63, each of the first to fourth vanes 64 to 67 remains in the state bearing on the shoes 69 in the retarding direction under hydraulic pressure. Accordingly, even when the plunger 54 is disengaged, the housing 44 and the rotor 52 are pressed against each other under the hydraulic pressure within the retarding hydraulic chambers 62, whereby vibration or shock can be suppressed to minimum.

Now, when the B-port 87 is opened for rotating the rotor 52 in the advancing direction, working oil is supplied to the advancing hydraulic chamber 63 by way of the second oil passage 43. Consequently, hydraulic pressure is transmitted to the communicating oil passage 70 from the advancing hydraulic chamber 63, as a result of which the slide plate 71 is caused to move toward the retarding hydraulic chamber 62 under the hydraulic pressure.

When the slide plate 71 is moved as mentioned above, the plunger oil passage 56 is placed in hydraulic communication with the advancing hydraulic chamber 63 by way of the communicating oil passage 70, whereby hydraulic pressure is transmitted to the plunger oil passage 56 from the advancing hydraulic chamber 63. Under the hydraulic pressure mentioned above, the plunger 54 is forced to move toward the housing 44 against the spring force exerted by the spring 55, which results in disengagement between the plunger 54 and the holder 53.

In this manner, by adjusting the amount of working oil by opening/closing the A-port 86 and the B-port 87 in the state where the plunger 54 and the holder 53 are disengaged from each other, rotation of the rotor 52 can be advanced or retarded relative to the rotation of the housing 44 owing to the regulation of the amount of working oil within the retarding hydraulic chamber 62 and the advancing hydraulic chamber 63.

Next, by referring to FIGS. 22 and 24, typical operation of the oil control valve 80 will be described. Incidentally, FIGS. 22 to 24 show, respectively, operating states of the oil control valve 80 when the control current i issued from the electronic control unit 100 assumes different values.

More specifically, FIG. 22 shows operation state of the oil control valve 80 when the value of the control current i is ia (e.g. 0.1 ampere) smaller than a reference current value ib (e.g. 0.5 ampere).

Referring to FIG. 22, the spool valve element 82 is resiliently urged to the left-hand side of the housing 81 under the force of the spring 84, whereby the oil supplying port 85 and the A-port 86 on one hand and the B-port 87 and the exhaust port 88*b* on the other hand are mutually communicated, as indicated by arrows.

In this state, working oil is fed to the retarding hydraulic chamber 62 while it is discharged from the advancing hydraulic chamber 63. Thus, the rotor 52 is forced to rotate in the counterclockwise direction relative to the housing 44 as indicated by arrow. Consequently, the phase of the intake-side cam shaft 19 retards relative to that of the intake timing pulley 21, whereby the intake valve 17 is placed in the retard control state, so to say.

FIG. 23 shows the operation state of the oil control valve 80 when the value of the control current i is equal to the reference current value ib (e.g. 0.5 ampere). In the state illustrated in FIG. 23, the forces exerted by the linear solenoid 83 and the spring 84, respectively, and acting in opposite directions to each other are in balance, as a result of which the spool valve element 82 is maintained at a position where both the A-port 86 and the B-port 87 are closed.

Consequently, the retarding hydraulic chamber 62 and the advancing hydraulic chamber 63 are in the states in which working oil is neither supplied nor discharged. Thus, the rotor 52 will be sustained at the current position so long as the leakage of working oil does not occur from the retarding hydraulic chamber 62 and the advancing hydraulic chamber 63, whereby the phase relation between the intake timing pulley 21 and the intake-side cam shaft 19 can be maintained in the currently prevailing state.

On the other hand, FIG. 24 shows operation state of the oil control valve 80 when the value of the control current i is ic (e.g. 1.0 ampere) which is greater than the reference current value ib (e.g. 0.5 ampere).

Referring to FIG. 24, the spool valve element 82 is urged to the right-hand side of the housing 81 under the influence of the linear solenoid 83, whereby the oil supplying port 85 and the B-port 87 on one hand and the A-port 86 and the exhaust port 88a on the other hand are mutually communicated, as indicated by arrows.

In this state, working oil is fed to the advancing hydraulic chamber 63 through the second oil passage 43, while being discharged from the retarding hydraulic chamber 62 through the first oil passage 42. Thus, the rotor 52 is forced to rotate in the clockwise direction relative to the housing 44 as indicated by arrow. Consequently, the phase of the intake-side cam shaft 19 is caused to advance relative to that of the intake timing pulley 21. Thus, the intake valve 17 is placed in the advance control state.

As can be seen from FIGS. 22 to 24, degree of hydraulic communication between the oil supplying port 85 and the A-port 86 or the B-port 87 as well as the degree of hydraulic communication between the exhaust port 88a or 88b and the A-port 86 or the B-port 87 can be controlled in dependence on the position of the spool valve element 82. In this conjunction, it is to be mentioned that the position of the spool valve element 82 and the value of the control current i flowing through the linear solenoid 83 bear a proportional relationship to each other.

FIG. 25 is a characteristic diagram for illustrating a relation between the value of the control current i flowing through the linear solenoid 83 and an actual valve timing change rate VTa. More specifically, there is graphically illustrated the rate of change of the actual valve timing (hereinafter also referred to as the actual valve timing change rate) designated by VTa as a function of the linear solenoid current i under predetermined operating condition of the engine 1. In FIG. 25, a positive or plus region of the actual valve timing change rate VTa represents the displacement in the advancing direction, while a negative or minus region of the actual valve timing change rate VTa corresponds to the region in which the displacement takes place in the retarding direction.

In FIG. 25, the electric current values ia, ib and ic represent values of the linear solenoid current i corresponding to the positions of the spool valve element 82 shown in FIGS. 22, 23 and 24, respectively. As can be seen from the figures, the value of the linear solenoid current i at which the actual valve timing Ta does not change (i.e., VTa=0) is only one current value ib at which the amount of working oil leaking from the hydraulic chambers 62 and 63 as well as the hydraulic pipe and the spool valve element 82 is in balance with the amount of working oil fed under pressure from the oil pump 91.

FIG. 26 is a characteristic diagram for illustrating variations in the relation between the control current i flowing through the linear solenoid and the actual valve timing change rate VTa, wherein a solid line curve shows the characteristic curve when the discharge pressure of working oil is relatively high while a broken line curve represents the characteristic curve when the discharge pressure of working oil is relatively low. In this conjunction, it is to be mentioned that the discharge pressure of working oil can vary in dependence on the engine rotation number NE and the temperature such as the cooling water temperature W.

As can be seen in FIG. 26, the reference current value ib changes constantly in dependence on the change in the discharge pressure of working oil. For instance, when the discharge pressure of working oil becomes low, the reference current value ib increases. Additionally, the manner in which the reference current value ib and hence the characteristic curve vary differs from one to another product such as the spool valve element 82 due to unevenness or dispersion of the dimensional factors or the like. When the discharge pressure of working oil becomes low, the rate of change VTa in the actual valve timing relative to the change of the linear solenoid current i will decrease.

Hereinafter, the linear solenoid current ib at which the actual valve timing Ta can remain invariable will be referred to as the holding current ih.

Ordinarily, when the valve timing is to be advanced with reference to the holding current ih, the linear solenoid current i may be set at a large value. On the contrary, when the valve timing is to be retarded, the linear solenoid current i may be set at a small value.

Next, valve timing detecting operation will be described by reference to FIG. 27 which is a timing chart for illustrating the crank angle signal SGT, the cam angle signal SGCd in the most retarded phase and the cam angle signal SGCa in the advanced phase. Phase relations between the crank angle signal SGT and the cam angle signals SGCd and SGCa as well as the actual valve timing Ta can be arithmetically determined on the basis of the data derived from the timing chart illustrated in FIG. 27.

The electronic control unit 100 is so designed or programmed as to measure a period T of the crank angle signal SGT as well as a phase-difference-equivalent time (hereinafter referred to as the phase difference time) ΔTa intervening between the cam angle signal SGCa and the crank angle signal SGT, i.e., the time corresponding to difference in phase between the cam angle signal SGCa and the crank angle signal SGT.

Further, the most retarded valve timing Td is arithmetically determined on the basis of a phase difference time ATd and the period T of the crank angle signal SGT in accordance with the following expression (1) when the valve timing retard is at maximum.

$$Td = (\Delta Td/T) \times 180 \; [° CA] \quad (1)$$

The result of the calculation mentioned above is stored in a random access memory or RAM incorporated in the electronic control unit 100.

Further, the electronic control unit 100 is programmed or designed to determine arithmetically an actual valve timing Ta on the basis of a phase difference time ΔTa, the period T of the crank angle signal SGT and the most retarded valve timing Td in accordance with the following expression (2):

$$Ta=(\Delta Ta/T)\times 180[° CA]-Td \quad (2)$$

Furthermore, the electronic control unit 100 is so designed as to make the actual valve timing Ta converge to a desired (or target) valve timing To through a feedback control of the linear solenoid current i on the basis of timing deviation or difference ER between the actual valve timing Ta and the desired valve timing To.

FIG. 28 is a block diagram showing schematically an internal configuration of the electronic control unit 100. As can be seen in the figure, the electronic control unit 100 includes a microcomputer 101.

Referring to FIG. 28, the microcomputer 101 is comprised of a CPU (central processing unit) 102 for executing various arithmetic operations, decision processings and others, a ROM (read-only memory) 103, a RAM (random access memory) 104 for storing temporarily the results of arithmetic operations (and/or other processings) executed by the CPU 102, an A/D (analogue-to-digital) converter 105 for converting an analogue signal to a digital signal, a counter 106 for counting the period of an input signal and/or other signal, a timer 107 for measuring a driving duration (duty cycle) of an output signal, an output port 108 constituting an output interface, and a common bus 109 for interconnecting the various blocks or components 102 to 108.

Provided in association with the microcomputer 101 is a first input circuit 110 which shapes the waveforms of the crank angle signal SGT outputted from the crank angle sensor 6 and the cam angle signal SGC generated by the cam angle sensor 24, wherein the output signal of the first input circuit 110 is supplied to the microcomputer 101 as an interrupt command signal INT.

Every time the interruption occurs in response to the interrupt command signal INT, the CPU 102 reads the value of the counter 106 to store it in the RAM 104.

Further, the CPU 102 arithmetically determines the period T of the crank angle signal SGT (see FIG. 27) on the basis of difference between the counter value at the time point when the preceding crank angle signal SGT was inputted and the current counter value, to thereby determine the engine rotation number (rpm) NE on the basis of the period T of the crank angle signal SGT.

Furthermore, the CPU 102 reads out from the RAM 104 the counter value in response to the cam angle signal SGC as inputted, to thereby determine arithmetically a phase difference time ΔT on the basis of the deviation from the counter value at the time point the crank angle signal SGT was inputted.

Further provided in association with the microcomputer 101 is a second input circuit 111 for fetching the cooling water temperature W from the water temperature sensor 12, the throttle opening degree θ from the throttle sensor 27 and the intake air flow Q from the intake air-flow sensor 28, respectively, wherein the output signal of the second input circuit 111 undergone noise elimination processing, amplification and other processings is supplied to the A/D converter 105 which converts the signals representing the cooling water temperature W, the throttle opening degree θ and the intake air flow Q into corresponding digital data, respectively. The digital output data signals outputted from the A/D converter 105 are inputted to the CPU 102.

The driving circuit 112 is designed to output a control signal for driving the fuel injector 30, while the driving circuit 113 is designed to output a control signal for driving the ignitor 11.

In response to the various input signals, the CPU 102 arithmetically determines the driving time or duration for the fuel injector 30 as well as the ignition timing for the ignitor 11 on the basis of the input signals, while driving the fuel injector 30 and the ignitor 11 by way of the output port 108, the driving circuits 112 and 113, respectively, for thereby controlling the fuel injection quantity and the ignition timing.

The current control circuit 114 is designed to control the linear solenoid current i of the oil control valve 80. To this end, the CPU 102 determines arithmetically the value of the linear solenoid current i of the oil control valve 80 on the basis of the various input signals mentioned above to thereby output through the output port 108 a duty signal corresponding to the linear solenoid current i for the oil control valve 80 on the basis of the result of the time measurement performed by the timer 107.

On the other hand, the current control circuit 114 controls the linear solenoid current i flowing through the linear solenoid 83 of the oil control valve 80 in accordance with the duty signal mentioned above, to thereby realize the control of the valve open/close timing.

Further provided is a power circuit 115 which is designed to generate a constant voltage from the voltage of a battery 116 supplied via a key switch 117. Thus, the microcomputer 101 can operate with the constant voltage supplied from the power circuit 115.

In the conventional valve timing control system for the internal combustion engine known heretofore such as disclosed in the Japanese Unexamined Patent Application Publication No. 299876/1994 (JP-A-6-299876), learning of the most retarded valve timing Td is carried out under predetermined condition, e.g. in the idling state in which the engine is operated at a low speed.

Consequently, once the most retarded valve timing Td is learned erroneously, the learned value can not be corrected to the optimal value unless the idling state is resumed. For example, in the case where foreign material is undesirably deposited on the contacting portion(s) of the valve in the course of idling operation of the engine or where the valve is stopped on the way of displacement without being controlled to the regular or correct value, erroneous learning of the most retarded valve timing Td can be taken place.

When such erroneously learned state occurs, it takes tremendously much time to relearn the most retarded valve timing Td and resume the normal or regular value therefor when the engine is operating in a cruising mode (i.e., off-idle operation mode). Thus, the valve timing control can not be performed correctly before the learned value resumes the regular or correct value, which may incur not only degradation of engine operation performance but also deterioration in quality of the exhaust gas.

As will now be appreciated from the foregoing description, the conventional valve timing control system for the internal combustion engine suffers a problem that the engine operation performance as well as the exhaust gas quality is degraded because the most retarded valve timing Td can be learned only in the predetermined engine operation mode (e.g. idle mode of low engine speed) and because lots of time is taken for effectuating again the proper value for the most retarded valve timing Td once it has been learned incorrectly.

SUMMARY OF THE INVENTION

In the light of the state of the art described above, it is an object of the present invention to provide a valve timing control system for an internal combustion engine, which system is capable of learning the most retarded valve timing in any operation mode of the internal combustion engine so long as the engine is operating and capable of storing an actually detected valve timing as a learned valve timing whenever the actually detected timing indicates retard greater than the most retarded valve timing learned in precedence while allowing the valve timing learned erroneously to resume speedily a desired or target valve timing, to thereby prevent degradation of engine operation performance as well as deterioration of exhaust gas quality.

In view of the above and other objects which will become apparent as the description proceeds, there is provided according to a general aspect of the present invention a valve timing control system for an internal combustion engine, which system includes an intake valve and an exhaust valve driven in synchronism with rotation of the internal combustion engine for opening/closing an intake passage and an exhaust passage, respectively, which are communicated to a combustion chamber of the internal combustion engine, an engine operation state detecting means for detecting operation states of the internal combustion engine, a desired valve timing arithmetic means for arithmetically determining a desired valve timing for at least one of the intake valve and the exhaust valve in dependence on the engine operation state as detected, a variable valve timing mechanism for changing open/close timing of at least one of the intake valve and the exhaust valve, an actual valve timing detecting means for detecting an actual valve open/close timing of at least one of the intake valve and the exhaust valve, an actual valve timing control means for generating a control quantity for the variable valve timing mechanism so that a timing deviation of the actual valve timing from the desired valve timing becomes zero, and a learning means for learning a most retarded valve timing of the actual valve timing as a learned value, wherein the learning means is so arranged as to reflect a detected value of the actual valve timing in the learned value when the actual valve timing is detected at a timing which retards relative to the learned value in the course of operation of the internal combustion engine, and wherein the actual valve timing control means is so arranged as to determine arithmetically the control quantity in dependence on the learned value as a maximum retard reference.

By virtue of the arrangement of the valve timing control system described above, the actual valve timing can be restored to the desired valve timing speedily and accurately, whereby deterioration of the exhaust gas quality due to continuation of degraded control performance can be prevented.

In a preferred mode for carrying out the invention, the leaning means may be so designed as to reflect the detected value of the actual valve timing in the learned value when the detected value of the actual valve timing indicates retard which exceeds the learned value by a predetermined value.

Owing to the arrangement of the valve timing control system described above, the actual valve timing learned erroneously can be restored speedily to the desired timing with high accuracy on the basis of the most retarded valve timing which ensures high reliability.

In another mode for carrying out the invention, the predetermined value mentioned above should preferably be so set as to be equivalent to a crank angle of ca. two degrees.

With the arrangement of the valve timing control system mentioned above, the most retarded valve timing can be set with high reliability by suppressing the influence such as elongation/contraction of the timing belt.

In yet another preferred mode for carrying out the invention, the learning means may be so designed as to modify a detected value of the actual valve timing by multiplying the detected value by a predetermined reflection ratio to thereby reflect the modified detected value in the learned value.

By virtue of the arrangement of the valve timing control system mentioned above, the most retarded valve timing can be set with enhanced reliability by suppressing the influence of the erroneous timing detection.

In still another mode for carrying out the invention, the above-mentioned reflection ratio should preferably be set variably in dependence on a rotation number of the engine such that the reflection ratio assumes a maximum value when the engine rotation number lies within an intermediate-speed range of the engine.

With the arrangement of the valve timing control system described above, influence of the variation of the engine rotation number can be avoided, whereby the most retarded valve timing can be set with high reliability.

In a mode for carrying out the invention, the above-mentioned intermediate-speed range of the engine rotation number should preferably be set to a range of 1500 to 3000 rpm.

With the arrangement of the valve timing control system mentioned just above, influence of variation of the engine rotation number can be suppressed positively.

In another mode for carrying out the invention, the learning means should preferably be so designed as to set variably the reflection ratio in dependence on an update frequency which indicates a number of times the learned value has been updated so that the reflection ratio assumes a smaller value as the update frequency increases.

With the arrangement of the valve timing control system mentioned just above, the most retarded valve timing can be set with high reliability and accuracy while suppressing the influence of erroneous valve timing detection.

In another mode for carrying out the invention, the reflection ratio mentioned just above should preferably be set to a constant value which is greater than zero, when the aforementioned update frequency of the learned value becomes greater than a predetermined value inclusive thereof.

Owing to the arrangement of the valve timing control system mentioned just above, the most retarded valve timing can be set with high reliability and accuracy while suppressing the influence of erroneous timing detection.

In another mode for carrying out the invention, the learning means mentioned above should preferably be so designed as to clear the update frequency when the learned value remains being not updated, to thereby set a number of times the learned value has been updated successively as the update frequency by counting the above-mentioned number of times.

With the arrangement of the valve timing control system mentioned just above, the most retarded valve timing can be set with high reliability and accuracy while suppressing the influence of erroneous detection to a possible minimum.

In yet another preferred mode for carrying out the invention, the learning means may be so designed that when a state in which the detected value of the actual valve timing indicates retard greater than that indicated by the learned value has continued for a predetermined time period, the detected value of the actual valve timing is reflected in the learned value.

In another mode for carrying out the invention, the predetermined time period mentioned just above should preferably be set to a time period equivalent to ca. 100 msec. in terms of a crank angle.

In conjunction with the above-mentioned mode, the learning means may preferably be so designed that when the detected value of the actual valve timing indicates retard which exceeds the learned value by a predetermined value, the detected value of the actual valve timing can be in the learned value.

Further, in conjunction with the arrangements mentioned above, the learning means may be so designed as to modify a detected value of the actual valve timing by multiplying the detected value by a predetermined reflection ratio to thereby reflect the modified detected value in the learned value.

With the arrangements of the valve timing control system mentioned above, the most retarded valve timing which can ensure enhanced reliability can be obtained nevertheless of change of the engine rotation speed (rpm).

Furthermore, in conjunction with the arrangements mentioned above, the learning means may preferably be so designed as to set variably the reflection ratio in dependence on an update frequency indicating a number of times the learned value has been updated so that the reflection ratio assumes a smaller value as the update frequency increases.

Moreover, in conjunction with the arrangements mentioned above, the learning means may preferably be so designed as to set variably the reflection ratio in dependence on dispersion of the detected value of the actual valve timing in the predetermined time period such that the reflection ratio assumes a smaller value as the dispersion increases.

Additionally, in conjunction with the arrangements-mentioned above, the learning means may preferably be so designed as to set variably the reflection ratio in dependence on the timing difference between the actual valve timing and the learned value in the predetermined time period.

Besides, in conjunction with the arrangements mentioned above, the learning means may also be so designed as to set variably the reflection ratio in dependence on variation of the timing difference in the predetermined time period so that the reflection ratio assumes a smaller value as the variation of the timing difference increases.

Similarly, the learning means may be so designed as to set variably the reflection ratio in dependence on magnitude of the timing difference in the predetermined time period so that the reflection ratio assumes a smaller value as the magnitude of the timing difference increases.

With the arrangements of the valve timing control system mentioned above, the most retarded valve timing can be set with high reliability and accuracy while suppressing the influence of the erroneous timing detection.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
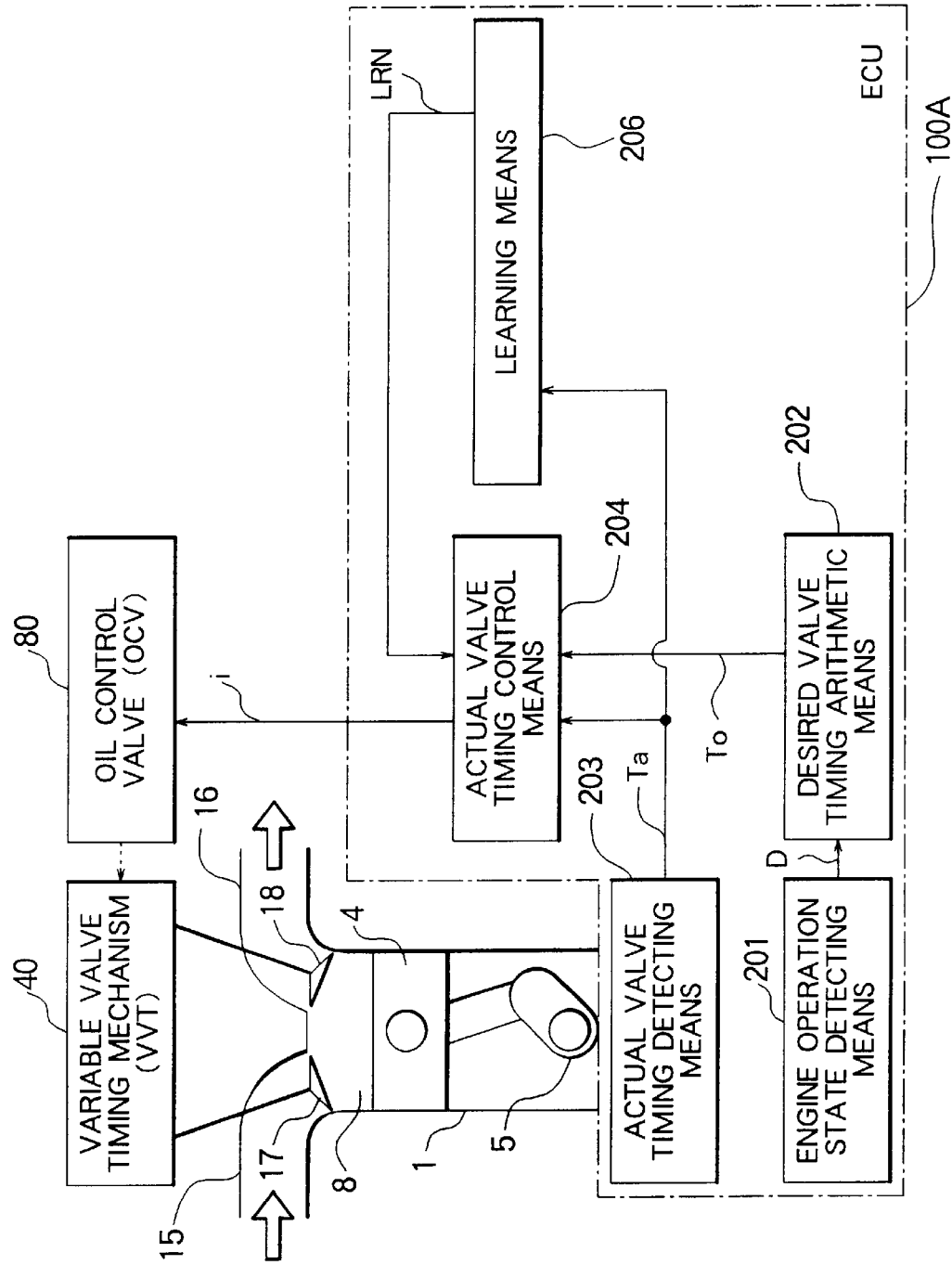
FIG. 1 is a functional block diagram showing conceptually and schematically a basic configuration of an internal combustion engine system equipped with a valve timing control system according to an embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Now, referring to a functional block diagram of FIG. 1 and a flow chart of FIG. 2, the valve timing control system for an internal combustion engine according to a first embodiment of the present invention will be described in detail.

The basic structures and operations of the variable valve timing mechanism (VVT) as well as peripheral equipment associated therewith are essentially same as those described hereinbefore by reference to FIGS. 15 to 28. Accordingly, repeated description thereof will be unnecessary.

FIG. 1 is a functional block diagram for illustrating conceptually and functionally operation programs executed by an electronic control unit (also referred to as the ECU) 100A incorporated in the valve timing control system according to the first embodiment of the invention. To say in another way, FIG. 1 shows various functional modules which can be realized in the form of operation programs executed by a microcomputer of the electronic control unit (ECU) 100A which constitutes a major part of the valve timing control system according to the invention. At this juncture, it should be added that the hardware structure including the variable valve timing mechanism to which the teachings of the invention incarnated in the instant embodiment can be applied is essentially same as or similar to that shown in FIG. 15, and the former differs from the latter in that some of the operation program modules executed by the microcomputer incorporated in the ECU 100A are changed or modified.

In FIG. 1, parts or components like as or equivalent to those mentioned hereinbefore are designated by like reference characters and repeated description thereof will be omitted.

Referring to FIG. 1, the ECU 100A is comprised of an engine operation state detecting means 201, a desired valve timing arithmetic means 202, an actual valve timing detecting means 203, an actual valve timing control means 204 and a learning means 206, for thereby controlling a current i flowing through the linear solenoid (hereinafter also referred to as the linear solenoid current i) of the oil control valve (OCV) 80 which is designed for driving the variable valve timing mechanism 40, as described hereinbefore in conjunction with the conventional technique.

The engine operation state detecting means 201 serves to detect the operation state D of the engine on the basis of output signals of the various types of sensors, while the desired valve timing arithmetic means 202 serves to arithmetically determine a desired valve timing To for at least one of the intake valve 17 and the exhaust valve 18 in dependence on the engine operation state D as detected.

On the other hand, the actual valve timing detecting means 203 is so designed as to detect an actual valve timing Ta for at least one of the intake valve 17 and the exhaust valve 18, while the actual valve timing control means 204 is designed to generate a control quantity (the linear solenoid current i defined hereinbefore) for the variable valve timing mechanism 40 so that a timing deviation of the actual valve timing Ta from the desired valve timing To (i.e., difference between the actual valve timing Ta and the desired valve timing To) becomes zero.

More specifically, the actual valve timing control means 204 is so designed as to arithmetically determine the control quantity (linear solenoid current i) while correcting the control quantity i with a learned value LRN used as a maximum retard reference value.

The variable valve timing mechanism 40 is driven by the oil control valve 80 to alter the open/close timing for at least one of the intake valve 17 and the exhaust valve 18, as described before.

Further, the leaning means 206 is designed to acquire or fetch the actual valve timing Ta in the course of operation of the engine 1 to thereby determine the most retarded valve timing value on the basis of the fetched actual valve timing Ta to be reflected in the learned value LRN required for the arithmetic determination of the actual valve timing Ta.

More specifically, the learning means 206 is so designed that whenever the actual valve timing Ta as detected in the engine operation range inclusive of the idle operation state is retarded more than the learned value LRN, the detected value of the actual valve timing Ta is immediately reflected in the learned value.

Figure 2:
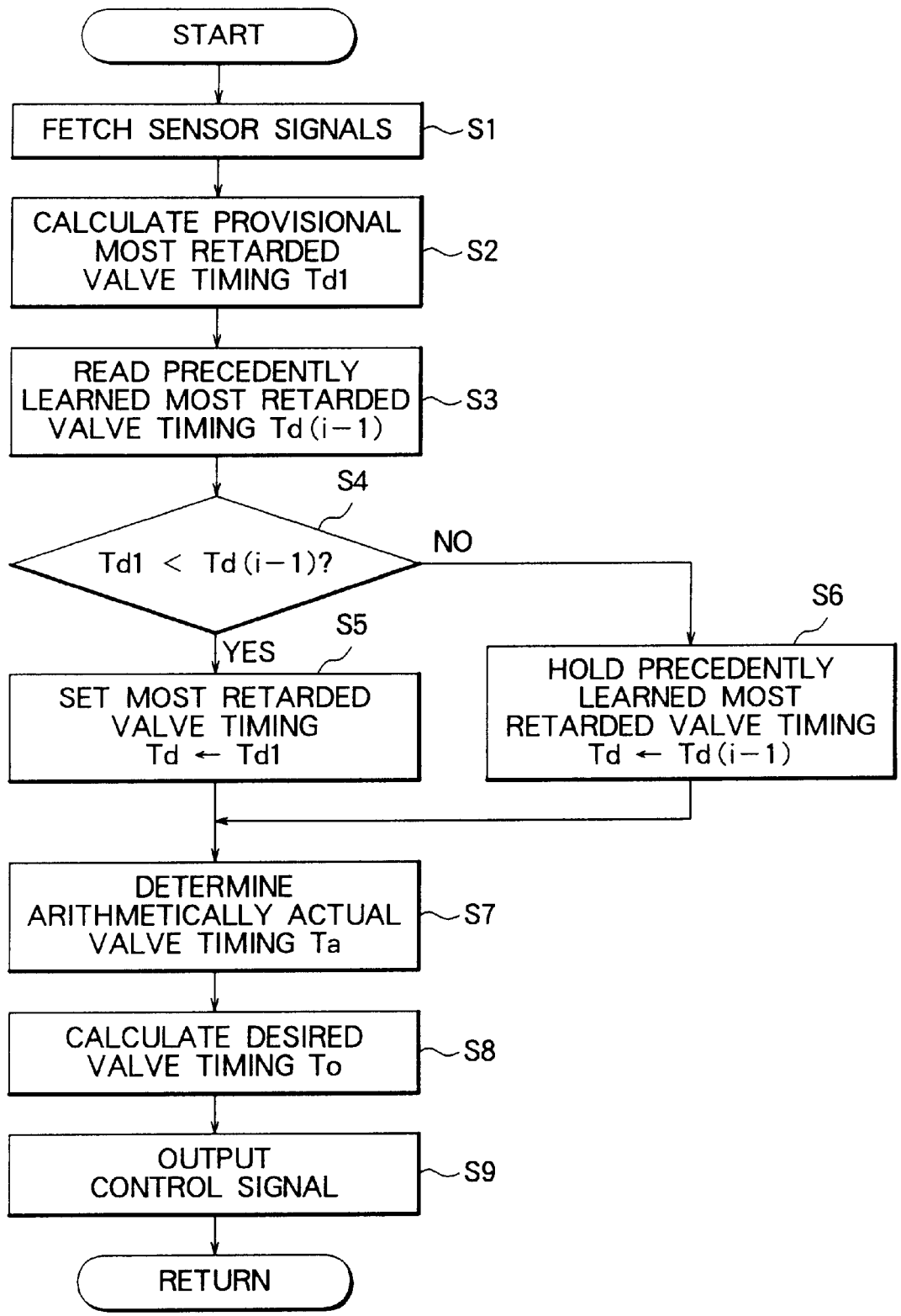
FIG. 2 is a flow chart for illustrating learning operation of the valve timing control system according to a first embodiment of the present invention.

Next, referring to FIG. 2, description will be directed to the learning operation or procedure executed in the valve timing control system according to the first embodiment of the present invention.

The program corresponding to the flow chart illustrated in FIG. 2 is executed by the CPU 102 incorporated in the microcomputer 101 (see FIG. 28) periodically at a predetermined interval, e.g. every 25 msec.

At first, in a step S1 shown in FIG. 2, the engine operation state signals such as the crank angle signal period T, the engine rotation number NE, the phase difference time $\Delta T$, the intake air quantity Q, the throttle opening degree e, the cooling water temperature W, etc. which are derived from the output signals of the various sensors are fetched by the CPU 102.

In succession, in a step S2, a provisional maximum retard valve timing Td1 (corresponding to the detected value of the actual valve timing Ta) is arithmetically determined as the currently most retarded valve timing Td in accordance with the expression (1) mentioned hereinbefore.

Further, in a step S3, the most retarded valve timing Td(i−1) learned in the preceding program cycle (hereinafter referred to as the preceding most retarded valve timing) is read out as a preceding learned value LRN.

Next, in a step S4, the provisional most retarded valve timing Td1 (hereinafter also referred to as the currently detected value or simply as the detected value) is compared with the preceding most retarded valve timing Td(i−1) for thereby deciding whether or not the relation or condition that Td1<Td(i−1) is satisfied, i.e., whether or not the currently detected value Td1 is more retarded than the preceding most retarded valve timing Td(i−1).

When the currently detected value Td1 indicates greater retard than that indicated by the preceding most retarded valve timing Td(i−1) in the step S4 (i.e., when the decision step S4 results in affirmation "YES"), the processing proceeds to a step S5.

By contrast, when it is decided in the step S4 that the detected value Td1 indicates retard smaller than or equal to the preceding most retarded valve timing Td(i−1) (i.e., when the decision step S4 results in negation "NO"), the processing proceeds to a step S6.

In the step S5, the detected value Td1 is stored as the current most retarded valve timing Td, whereon the processing proceeds to a step S7.

On the other hand, in the step S6, the preceding most retarded valve timing Td(i−1) is intactly held as the currently most retarded valve timing Td, whereon the processing proceeds to the step S7.

In the step S7, the actual valve timing Ta is arithmetically determined in accordance with the expression (2) mentioned hereinbefore.

Subsequently, in a step S8, a target or desired valve timing To is arithmetically determined on the basis of the quantities indicated by the engine operation state signals, i.e., the engine rotation number (rpm) NE, the intake air flow Q, the throttle opening degree θ and the cooling water temperature W.

Finally, in the step S9, the CPU arithmetically determines such linear solenoid current i that the actual valve timing Ta (i.e., the arithmetically determined value in the step S7) can converge to the target or desired valve timing To (i.e., the value arithmetically determined in the step S8), to thereby output a duty signal corresponding to the current control quantity i to the linear solenoid of the oil control valve 80, whereupon the processing routine illustrated in FIG. 2 comes to an end (RETURN).

In general, the learned value which is used as the reference value for the intended control is updated under various conditions with a view to preventing erroneous or incorrect learning. In this conjunction, it should be noted that since the most retarded valve timing Td of the variable valve timing mechanism 40 is always influential during the valve timing control, the timing Td should desirably be corrected as speedily as possible in conformance with the detected value of the actual valve timing Ta.

According to the teachings of the invention incarnated in the first embodiment, the most retarded valve timing Td (learned value LRN) can always be set to the optimum value in the course of operation of the engine 1, as described above. Thus, the optimum value can be resumed immediately even when the most retarded valve timing Td is learned erroneously, whereby the quality of the engine exhaust gas can be protected against degradation.

Embodiment 2

In the case of the valve timing control system according to the first embodiment of the invention, the learned value LRN is updated unconditionally when the detected value of the actual valve timing Ta is retarded more than the precedently learned value. However, such arrangement may be adopted that the detected value of the actual valve timing Ta is reflected in the learned value LRN when the detected value of the actual valve timing Ta indicates retard which exceeds that indicated by the precedently learned value by a predetermined value.

In the following, referring to a flow chart of FIG. 3, description will be made of the valve timing control system according to a second embodiment of the present invention in which the detected value of the actual valve timing Ta is reflected in the learned value LRN only when the detected value of the actual valve timing Ta indicates retard greater than that indicated by the precedently learned value by a predetermined value.

Incidentally, the functional arrangement of the ECU 100A according to the instant embodiment of the invention is substantially same as that shown in FIG. 1.

Figure 3:
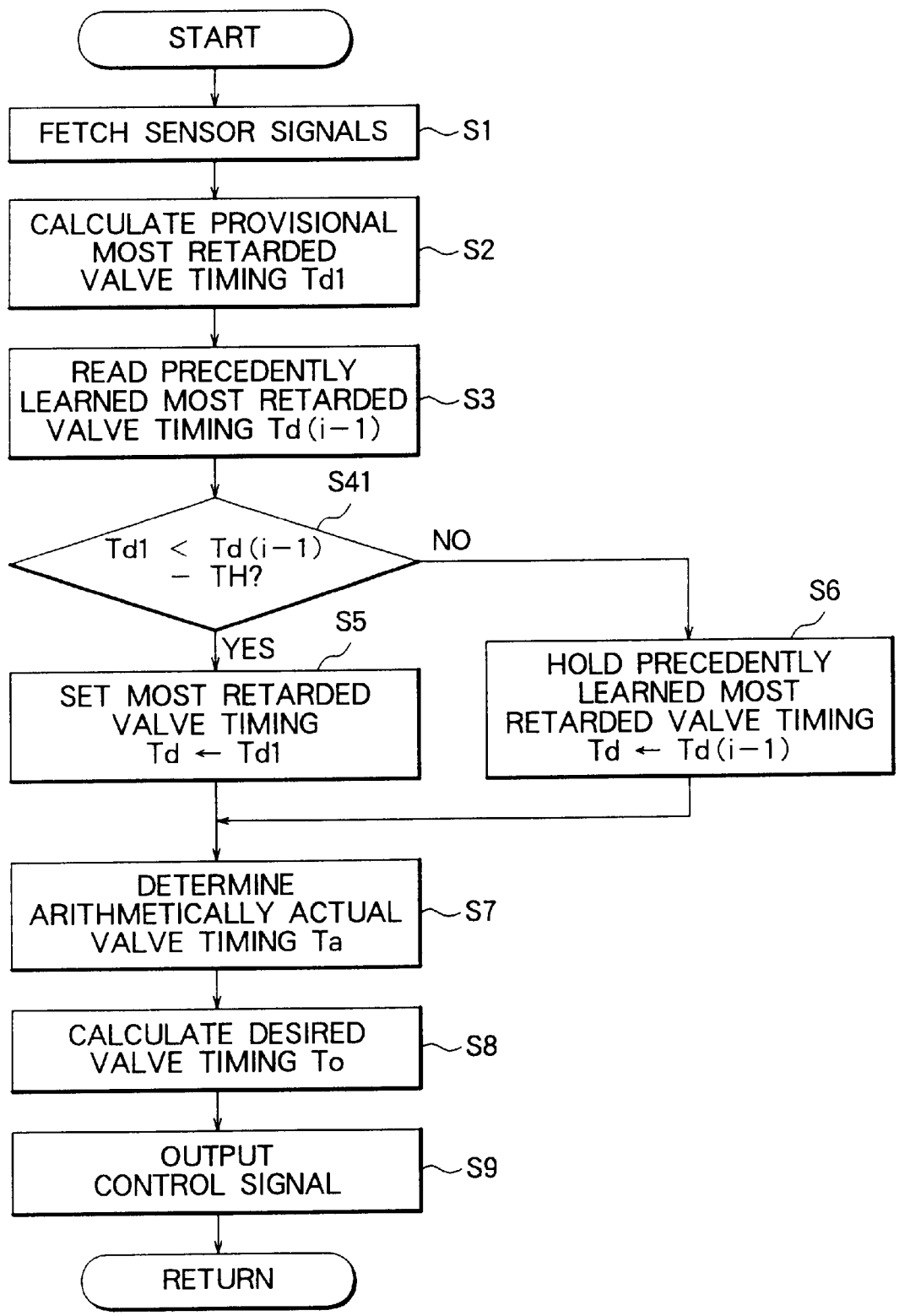
FIG. 3 is a flow chart for illustrating a learning operation in the valve timing control system according to a second embodiment of the present invention.

Further, the steps S1 to S3 and steps S5 to S9 shown in FIG. 3 are similar to those described hereinbefore by reference to FIG. 2. Besides, the step S41 shown in FIG. 3 corresponds to the step S4 described previously.

Now referring to FIG. 3, after the detected value Td1 and the preceding most retarded valve timing Td(i−1) have been arithmetically determined in the steps S2 and S3, respectively, the detected value Td1 is compared with the preceding most retarded valve timing Td(i−1) in the step S41.

In other words, by taking into consideration a predetermined value TH used as a reference value for comparison, it is decided in the step S41 whether or not a condition that Td1<Td(i−1)−TH is satisfied, i.e., whether the currently detected value Td1 indicates retard greater than the preceding most retarded valve timing Td(i−1) by the predetermined value TH.

In this conjunction, the predetermined value TH may be set so as to be equivalent to the crank angle of approximately approximately 2° in consideration of elongation (expansion)/contraction of the timing belt 23 (see FIG. 15) and other factors.

When it is decided in the step S41 that Td1<Td(i−1)−TH, i.e., when the decision step S41 results in affirmation "YES", the processing proceeds to the step S5. By contrast, when it is decided that Td1≧Td(i−1)−TH, i.e., when the decision step S41 results in negation "NO", the processing proceeds to the step S6.

In this way, the most retarded valve timing Td can be set with high reliability without being affected by the influence of elongation/contraction of the timing belt 23.

Thereafter, the actual valve timing control means 204 arithmetically determines the control quantity i through the processing steps S7, S8 and S9, as described hereinbefore to thereby output the corresponding control signal to the oil control valve 80.

Embodiment 3

In the case of the valve timing control system according to the first and second embodiments of the invention, the currently detected value of the actual valve timing Ta is reflected straightforwardly in the learned value LRN. However, such arrangement can be adopted that a value obtained by multiplying the currently detected value by a predetermined ratio is reflected in the learned value LRN. In this conjunction, the predetermined ratio will hereinafter be also referred to as the reflection ratio only for convenience of the description. Parenthetically, the value of the reflection ratio should not be greater than "1" (one) (i.e., should be ≦1).

Figure 4:
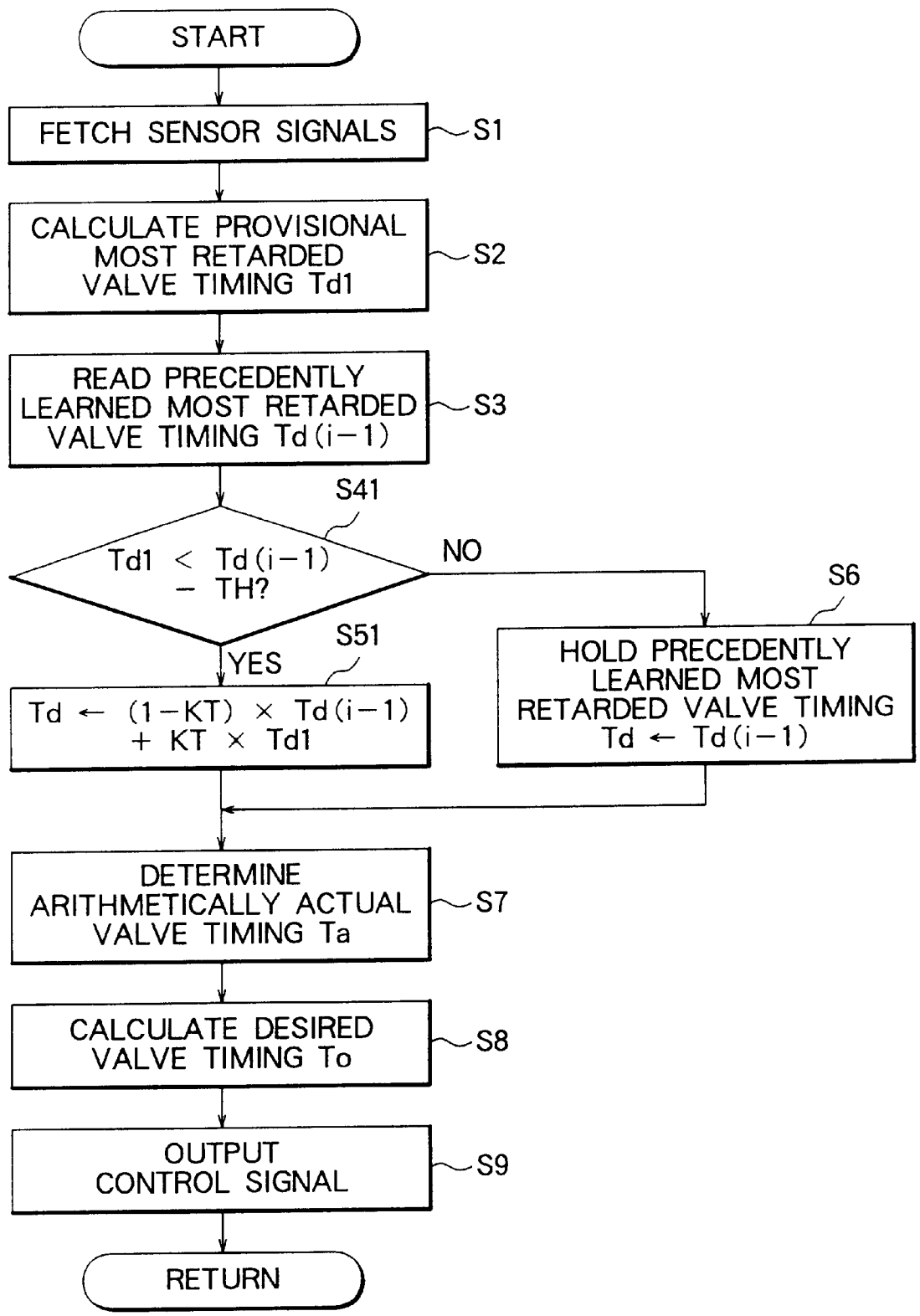
FIG. 4 is a flow chart for illustrating a learning operation according to a third embodiment of the present invention.

Now, referring to a flow chart of FIG. 4, description will be directed to the valve timing control system according to a third embodiment of the invention in which the detected value corrected by the predetermined reflection ratio is reflected in the learned value LRN.

In FIG. 4, the steps S1 to S3, S41 and steps S6 to S9 are similar to those described previously by reference to FIG. 3. Further, a step S51 shown in FIG. 4 corresponds to the step S5 described hereinbefore. It should be noted that the step S4 shown in FIG. 2 is replaced by a step S41 shown in FIG. 4.

Referring to FIG. 4, when it is decided in the step S41 (or step S4) that the detected value Td1 indicates retard greater than the learned value LRN, i.e., when the decision step S41 results in affirmation "YES", the processing proceeds to a step S51.

In the step S51, the learning means 206 multiplies the detected value Td1 (i.e., the detected value of the actual valve timing Ta) by a predetermined reflection ratio KT (i.e., reflection ratio or coefficient of a fixed value in this case), to thereby update correspondingly the learned value LRN, whereon the most retarded valve timing Td is determined arithmetically in accordance with the following expression (3):

$$Td = (1-KT) \times Td(i-1) + KT \times Td1 \quad (3)$$

In the above expression, it is assumed that the reflection ratio KT for the detected value Td1 of the most retarded valve timing Td is set to a fixed value which is not greater than "1" (one), by way of example.

By multiplying the detected value Td1 by the reflection ratio KT to thereby reflect the result of the multiplication in the most retarded valve timing Td, as described above, influence of noise components or the like superposed on the currently detected value can be suppressed, to an advantage.

Embodiment 4

In the valve timing control system according to the third embodiment of the invention, the reflection ratio KT is set to the fixed value. However, the reflection ratio KT can be set variably in dependence on the engine speed or engine rotation number (rpm) NE.

A fourth embodiment of the invention is directed to the valve timing control system in which the reflection ratio KT is set variably in dependence on the engine rotation number (rpm) NE.

Figure 5:
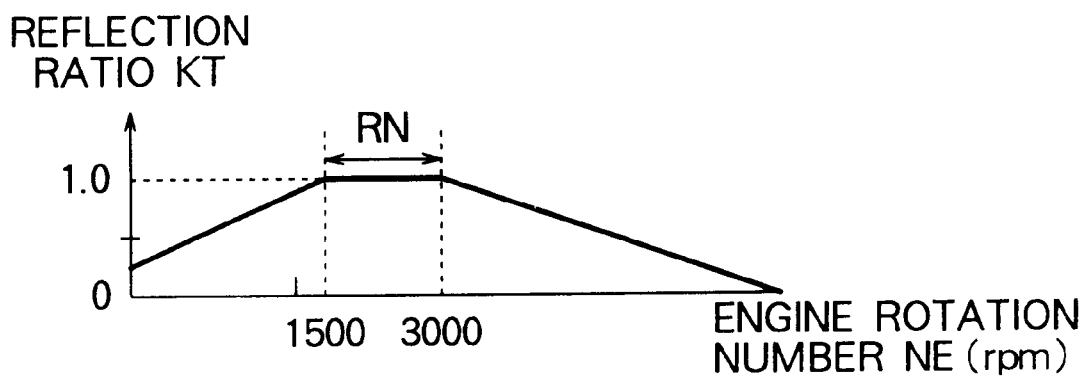
FIG. 5 is a view for illustrating graphically variable setting of a reflection in the valve timing control system according to a fourth embodiment of the present invention.

FIG. 5 is a view for illustrating graphically in what manner the reflection ratio KT set variably is changed as a function of the engine rotation number in the system according to the fourth embodiment of the invention.

Referring to FIG. 5, the reflection ratio KT is set to a maximum value (=1 (one)) so long as the engine rotation number NE falls within an intermediate-speed range RN, while the value of the reflection ratio KT is decreased in the other engine speed (rpm) ranges.

In that case, the intermediate-speed range RN of the engine rotation number NE should preferably be set to a range of 1500 to 3000 rpm. As deviation of the engine speed from the intermediate-speed range RN increases, the reflection ratio KT is regulated to assume a smaller value.

Ordinarily, variation of the engine rotation number NE is more remarkable in the lower engine-rotation speed ranges than the intermediate-speed range RN. Accordingly, the reflection ratio KT should be set to a smaller value in the lower speed range in order to evade effectively the influence of variation of the engine speed or engine rotation number NE.

On the other hand, in a higher-rotation speed range where the engine rotation number NE is not smaller than that in the intermediate-speed range RN, elongation of the timing belt 23 will become significant. Accordingly, the reflection ratio KT should be set to a small value for suppressing the influence of elongation of the timing belt 23.

In this manner, by setting variably the reflection ratio KT to a value which depends on the engine rotation number NE, as illustrated characteristically in FIG. 5, the most retarded valve timing Td can be set optimally with high reliability without being affected by the influences of variation of the engine rotation number and elongation of the timing belt 23.

At this juncture, it should be mentioned that the characteristic relation between the reflection ratio KT and the engine rotation number NE such as illustrated in FIG. 5 can be easily stored in a memory in the form of a map data table with the engine rotation number NE being used as index. In that case, determination of the reflection ratio KT can be much facilitated. Further, it should be added that although the-maximum value of the reflection ratio KT in the intermediate-speed range RN is set to "1" (one), it may be set to any given value, e.g. "0.8" provided that it remains smaller than one.

Embodiment 5

In the valve timing control system according to the fourth embodiment of the invention, the engine rotation number NE is used as the parameter for setting the reflection ratio KT variably. However, such arrangement can also be adopted that the reflection ratio KT is set variably in dependence on a number of times the most retarded valve timing Td (i.e., the learned value LRN) has been updated. Hereinafter, this parameter will also be referred to simply as the update frequency record CLTD only for convenience of the description.

Now, referring to FIGS. 6 and 7, description will be made of the valve timing control system according to a fifth embodiment of the present invention in which the reflection ratio KT is set variably in dependence on the update frequency record CLTD defined above. Incidentally, FIG. 6 is a flow chart for illustrating the processing procedure according to the instant embodiment of the invention, and FIG. 7 is a view for graphically illustrating a characteristic relation between the reflection ratio KT and the update frequency record CLTD of the most retarded valve timing Td (learned value LRN).

Figure 7:
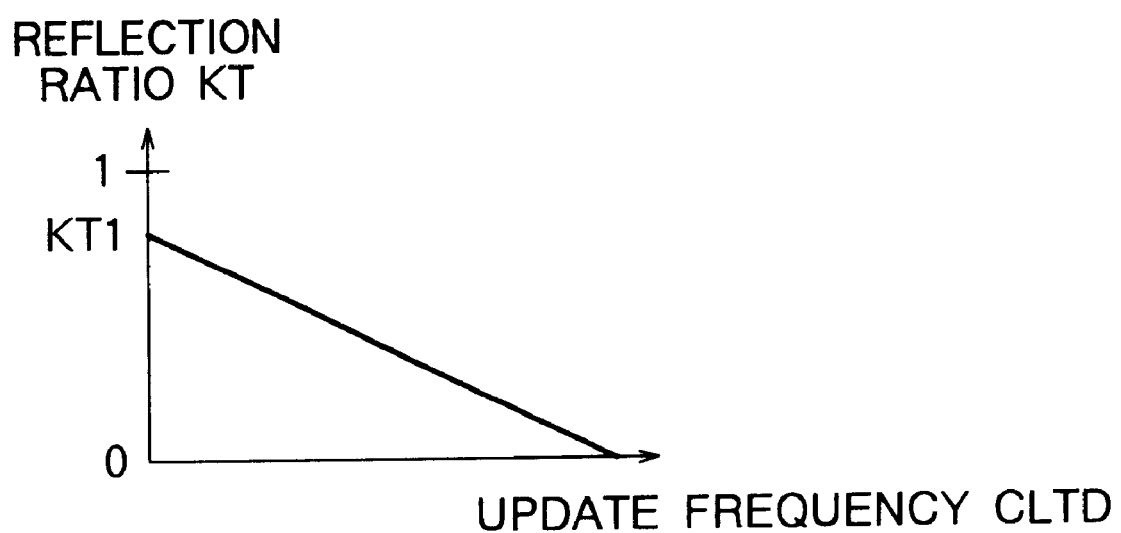
FIG. 7 is a view for illustrating graphically variable setting of the reflection ratio by using as a parameter a number of times the learned value has been updated.

According to the instant embodiment of the invention, the leaning means 206 is so designed as to set the reflection ratio KT to a smaller value as the update frequency record CLTD of the learned value LRN increases, as can be seen in FIG. 7. At this juncture, it should be added that a maximum value KT1 (i.e., an initial value) of the reflection ratio KT should preferably be set to ca. "0.8".

Figure 6:
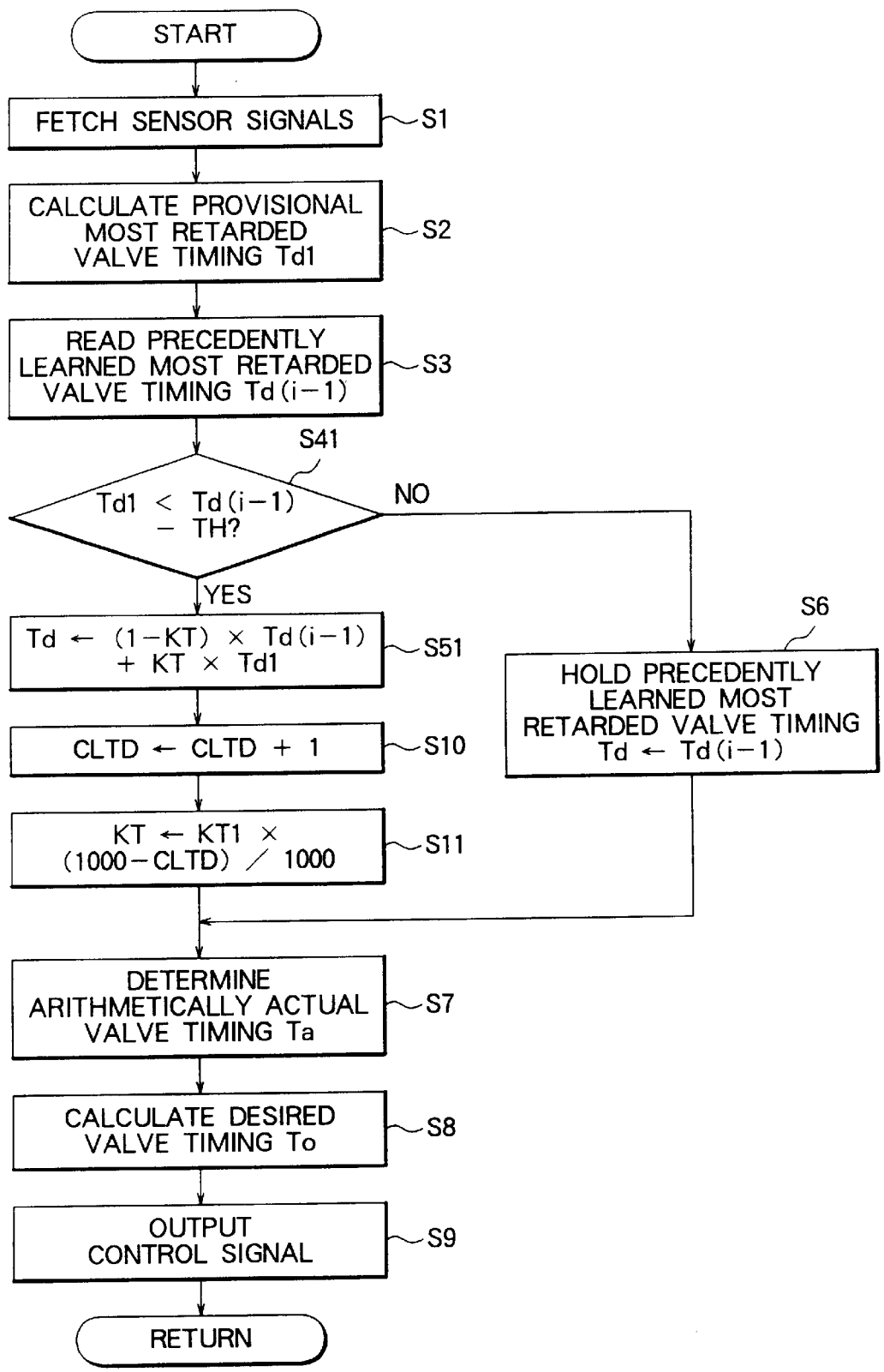
FIG. 6 is a flow chart for illustrating a learning operation in the valve timing control system according to a fifth embodiment of the invention.

In FIG. 6, the steps S1 to S3, S41, S51 and steps S6 to S9 are similar to those described previously by reference to FIG. 4. The instant embodiment differs from the third embodiment described hereinbefore by reference to FIG. 4 in that steps S10 and S11 are additionally provided in succession to the step S51 and that the step S4 shown in FIG. 2 is replaced by the step S41.

Referring to FIG. 6, when the learning means 206 updates the most retarded valve timing Td in the step S51, the processing proceeds to the step S10 where a value of an update counter, i.e., the update frequency record CLTD, is incremented by one.

In succession, in the step S11, the learning means 206 determines arithmetically the reflection ratio KT in consideration of the update frequency record CLTD in accordance with the following expression (4):

$$KT = KT1 \times (1000 - CLTD)/1000 \quad (4)$$

As can be seen from the above expression (4), the reflection ratio KT is set to a maximum value KT1 (e.g. "0.8") in the initial state (CLTD=0) and decreased gradually as the update frequency record CLTD increases or increments, as illustrated in FIG. 7.

Furthermore, as can be seen from the expression (4), when the update frequency record CLTD is incremented one thousand times or more, the reflection ratio KT is set to "0" (zero) because then 1000−CLTD=0.

Parenthetically, relations between the reflection ratio KT given by the expression (4) and the update frequency record CLTD as illustrated in FIG. 7 can be stored in a memory in the form of a map data table with the update frequency record CLTD being used as the index, for thereby facilitating the arithmetic operation as involved.

By decreasing the reflection ratio KT as the update frequency record CLTD of the learned value LRN increases in this manner, it is possible to reduce the reflection ratio KT as the learning process proceeds, to thereby mitigate progressively the influence of the learned value to the valve open/close timing control.

In general, the state in which the learned value LRN is updated successively is an unstable state in which the reference for the control is susceptible to variation, which in turn means an unfavorable engine operation state for the valve open/close timing control. Accordingly, when the update frequency record CLTD (i.e., the number of times the learned value LRN has been updated) increases, the reflection ratio KT should preferably be decreased, to thereby avoid the influence of unstable engine operation state.

Embodiment 6

In the valve timing control system according to the fifth embodiment of the invention, the reflection ratio KT is set to "0" (zero) when the update frequency record CLTD reaches the upper limit frequency records (e.g. one thousand of times). However, such arrangement can also be adopted that the update frequency record CLTD is clipped when it has reached a predetermined update frequency value (e.g. nine hundreds of times) and the reflection ratio KT is fixed to a constant value (e.g. 0.1×KT1) after the update frequency record CLTD has reached the predetermined value. A sixth embodiment of the invention is directed to the arrangement mentioned above.

Thus, according to the instant embodiment of the invention, the detected value Td1 can be reflected in the most retarded valve timing Td at the reflection ratio KT which is constantly greater than "0" (zero).

Needless to say, the upper limit value of the update frequency record CLTD is not limited to any specific value such as "one thousand of times" mentioned above but can be set to a given update frequency value such as ten times or so.

Besides, the update frequency record CLTD may be stored as the so-called backup data in a memory so that the update frequency record CLTD can be held in the memory even after turn-off of the key switch employed for starting the engine, so that automatic initialization can be realized upon succeeding start of the engine.

Embodiment 7

In the valve timing control system according to the sixth embodiment of the invention, the update frequency record CLTD is determined simply by counting. However, such arrangement may equally be adopted that the update frequency value CLTD is determined or effectuated only when the update processing is performed successively or consecutively.

Referring to a flow chart illustrated in FIG. 8, description will be made of a valve timing control system according to a seventh embodiment of the present invention in which the update frequency value CLTD is incremented when the update processing is performed successively.

Figure 8:
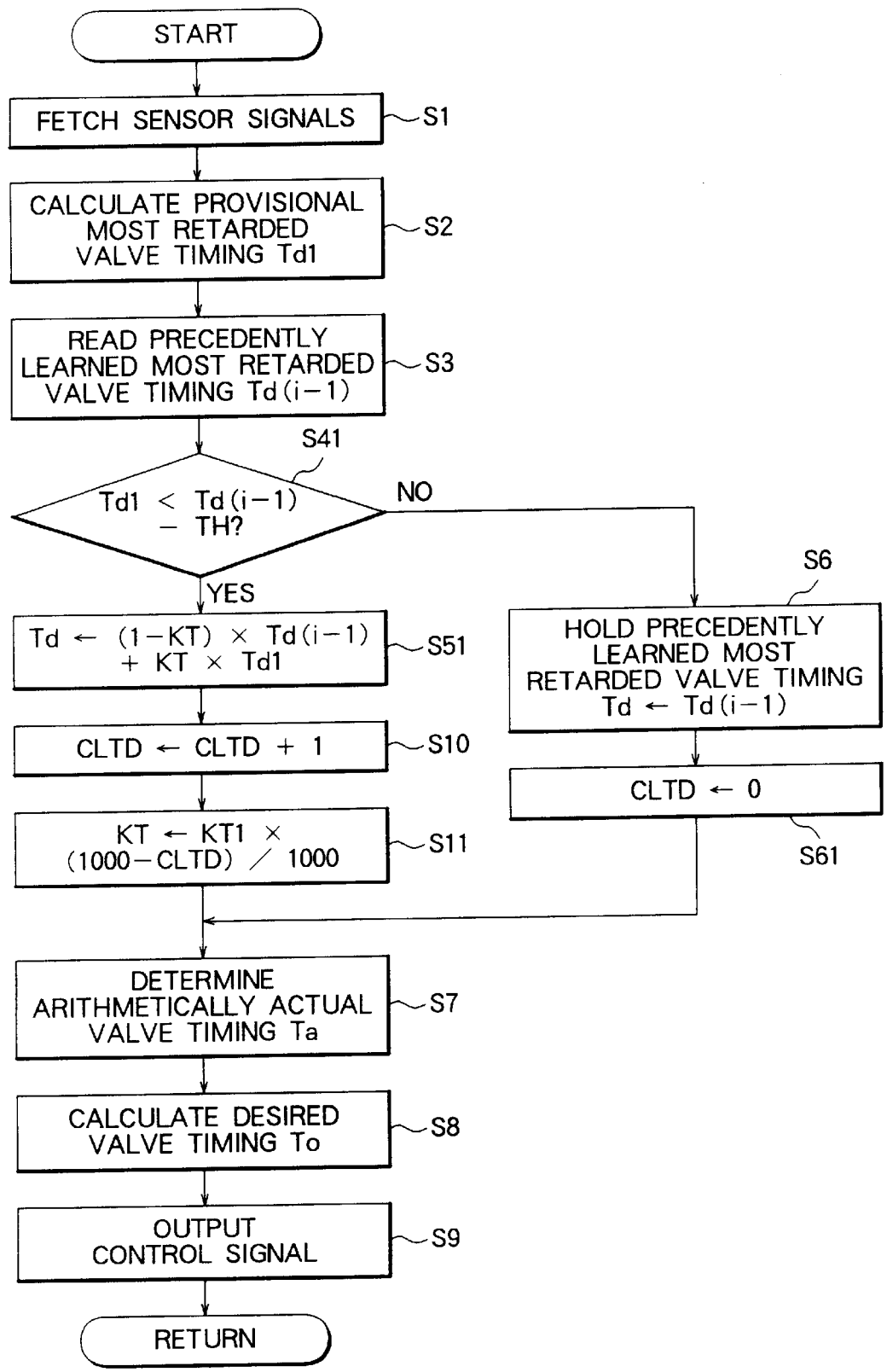
FIG. 8 is a flow chart for illustrating a learning operation in the valve timing control system according to a seventh embodiment of the present invention.

In the flow chart shown in FIG. 8, the steps S1 to S3, S41, S51 and the steps S6 to S11 are similar to those described previously by reference to FIG. 6. The instant embodiment differs from the fifth embodiment described previously in that a step S61 is provided additionally to the step S6. Further, it should be added that the step S4 shown in FIG. 2 is replaced by a step S41 shown in FIG. 8.

Referring to FIG. 8, when the result of comparison between the detected value Td1 and the preceding most retarded valve timing Td(i−1) does not satisfy the retard condition in the step S41, i.e., when the decision step S41 results in negation "NO", the processing executed by the learning means 206 proceeds to the step S61 in succession to the step S6 in which the update frequency record CLTD is reset to zero, whereon the processing proceeds to the step S7.

In this way, the update frequency record CLTD is immediately cleared to zero when the learned value LRN is not updated consecutively. In other words, the update frequency record CLTD is incremented by counting or validated only when the update processing is executed consecutively. Thus, even when the reflection ratio KT is being decreased through the update processing of the learned value LRN, the reflection ratio KT can be resumed to the maximum value (the initial value) KT1 upon every occurrence of the state in which the reflection ratio KT is not updated. In this manner, decreasing of the learned value LRN in excess can be evaded effectively.

Embodiment 8

In the case of the valve timing control system described hereinbefore in conjunction with the second embodiment of the invention, the detected value of the valve timing Ta is compared with the precedently learned value while taking into consideration the predetermined value TH in the step S41 in order to suppress the influence of elongation/contraction of the timing belt 23. However, such arrangement may also be adopted that the detected value of the actual valve timing Ta is reflected in the learned value LRN when the state in which the detected value indicates retard greater than that indicated by the precedently learned value has continued for a predetermined period.

Referring to a flow chart illustrated in FIG. 9, description will be made of the valve timing control system according to an eighth embodiment of the present invention which is so designed that the detected value is reflected in the learned value LRN only when the retard state mentioned above has continued for a-predetermined period.

Figure 9:
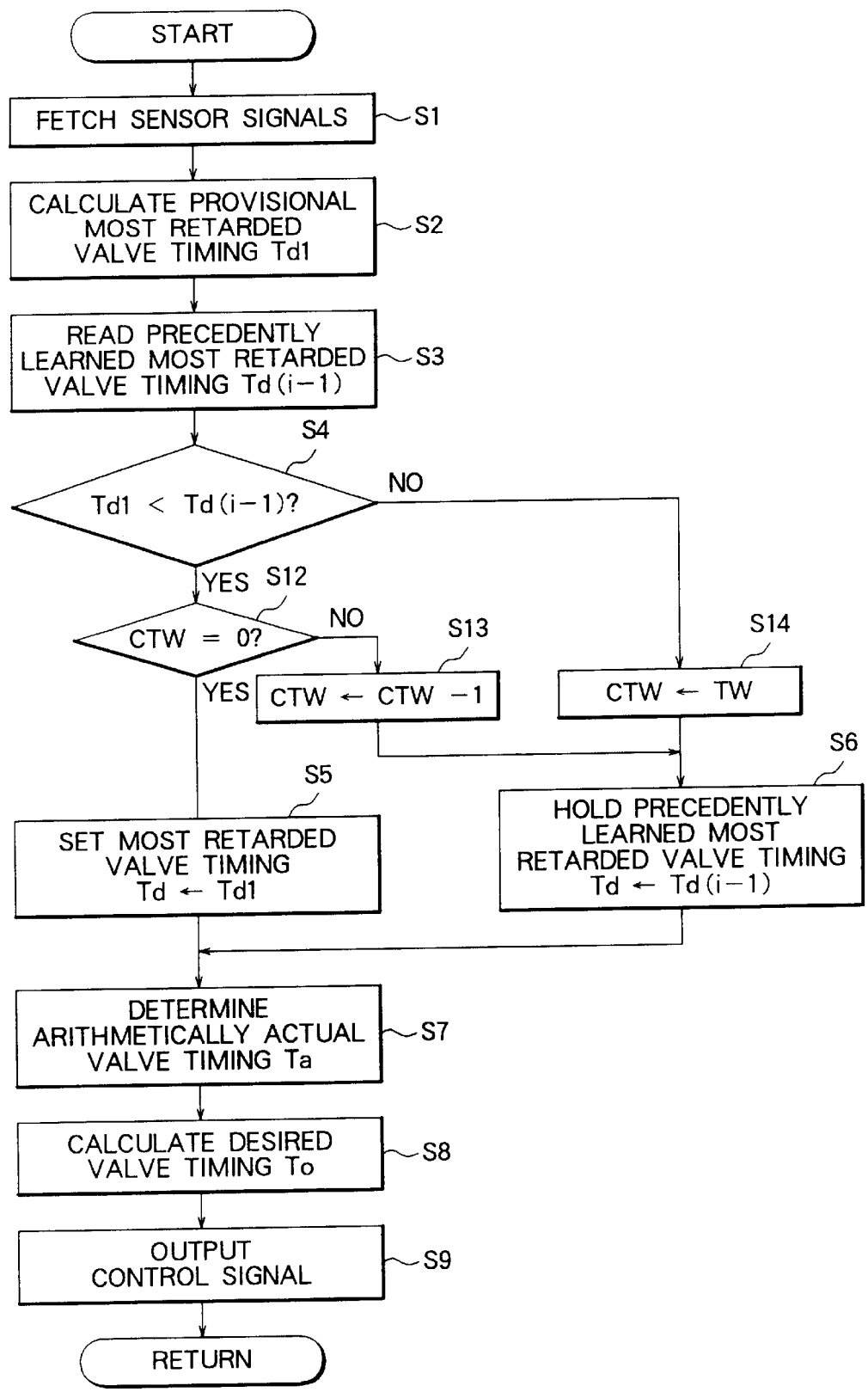
FIG. 9 is a flow chart for illustrating a learning operation in the valve timing control system according to an eighth embodiment of the present invention.

In FIG. 9, steps S1 to S9 are similar to those mentioned hereinbefore by reference to FIG. 2. The instant embodiment differs from the second embodiment described previously in that steps S12 to S14 are additionally provided in succession to the step S4 shown in FIG. 2.

In the valve timing control system according to the eighth embodiment, it is decided in the step S4 shown in FIG. 9 whether Td1<Td(i−1). When the decision step S4 results in affirmation "YES", the processing proceeds to the step S12 before executing the step S5 of updating the most retarded valve timing Td.

In the step S12, decision is made whether or not a value CTW of an update wait timer constituted by a down-counter (which value indicates lapse of a predetermined time period TW) is "0" (zero) or greater than zero. When it is decided that the value CTW (indicating lapse of the predetermined time period TW) is equal to zero (i.e., when the decision step S12 results in "YES"), the processing proceeds to the step S5 and then the most retarded valve timing Td is updated.

On the other hand, when it is decided in the step S12 that the value CTW is greater than zero (CTW>0), the processing proceeds to the step S13, and the update wait timer value CTW is decremented. Then, the processing proceeds to the step S6 for holding the current most retarded valve timing Td.

In this way, so long as the update wait timer value CTW remains continuously greater than "0" as of the first decision of the retard state in the step S4, the processing does not proceed to the step S5 but the most retarded valve timing Td is held in the step S6.

On the contrary, when it is decided in the step S4 that the detected value Td1 indicates retard equal to or greater than the preceding most retarded valve timing Td(i−1)(i.e., when the decision step S4 results in "NO"), the processing proceeds to a step S14 before executing the processing in the step S6, and a predetermined time period (wait time) TW is set as the update wait timer value CTW.

Figure 15:
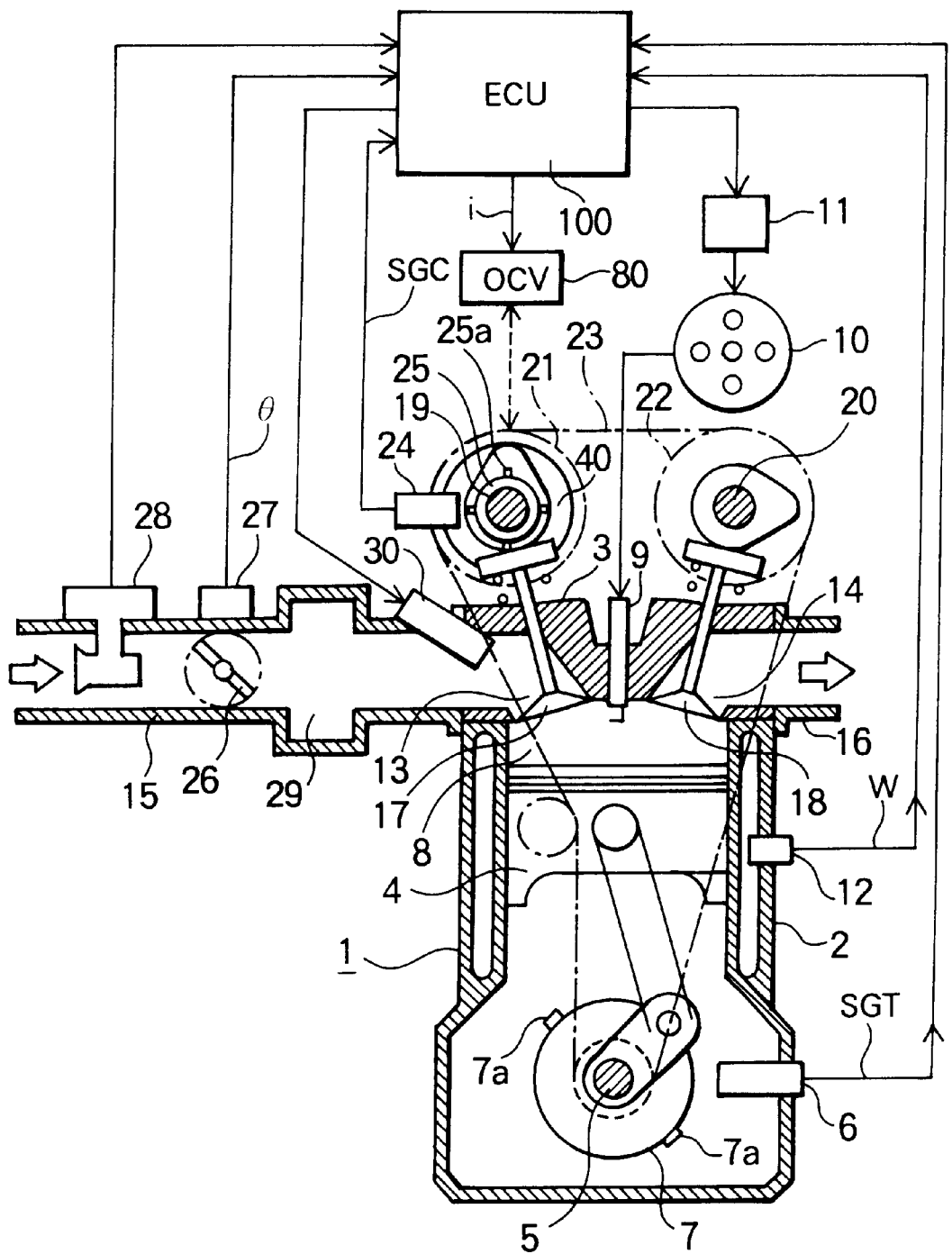
FIG. 15 is a schematic diagram showing generally a configuration of a gasoline engine system equipped with a conventional variable valve timing mechanism.
Figure 16:
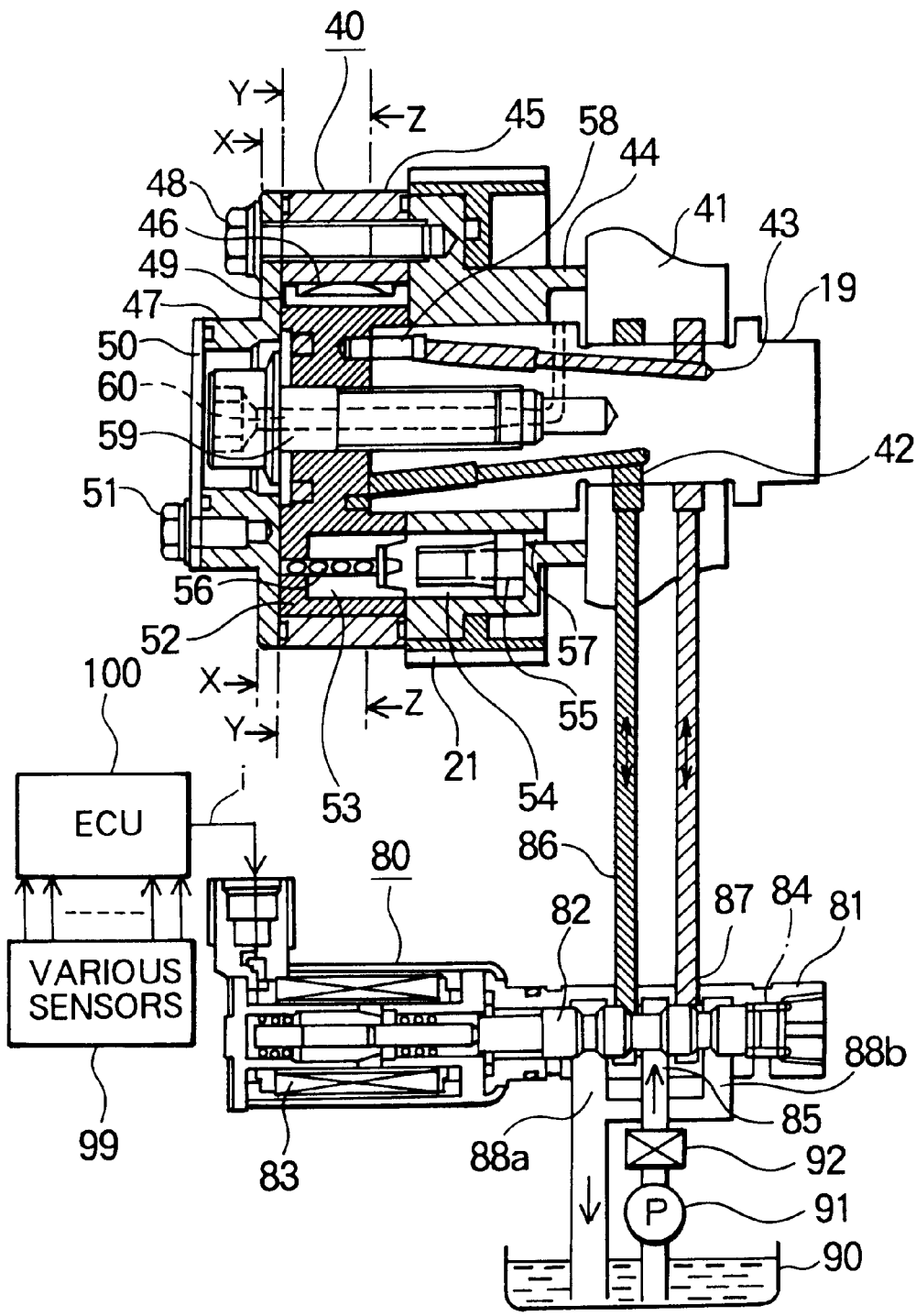
FIG. 16 is a side elevational view showing partially in section a structural arrangement around a variable valve timing mechanism and an oil control valve serving as a working oil supplying means in the conventional valve timing control system shown in FIG. 15.
Figure 17:
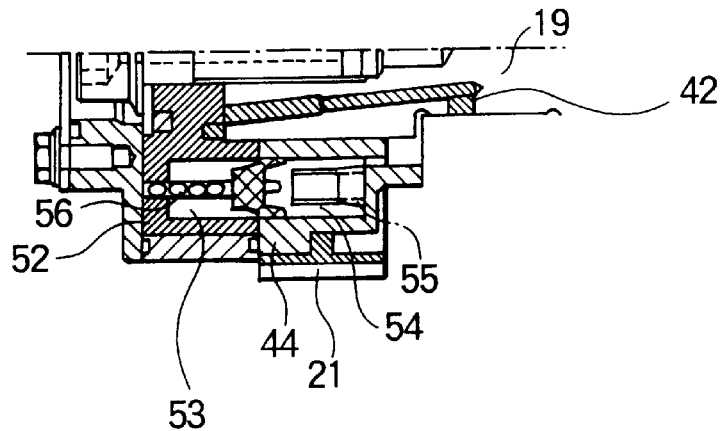
FIG. 17 is a fragmentary sectional view for illustrating operation of the variable valve timing mechanism shown in FIG. 16.
Figure 18:
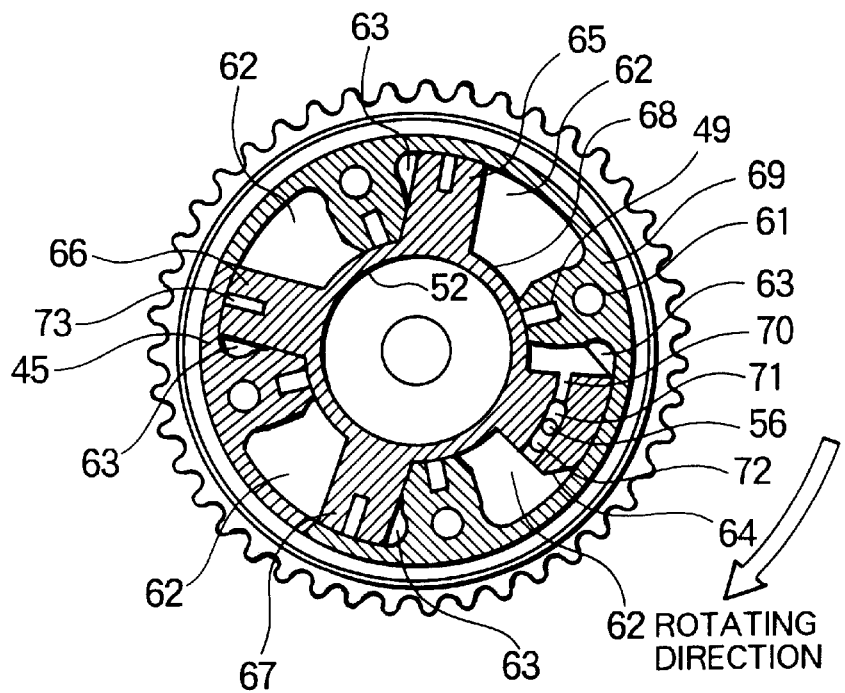
FIG. 18 is a sectional view taken along a line X—X in FIG. 16.
Figure 19:
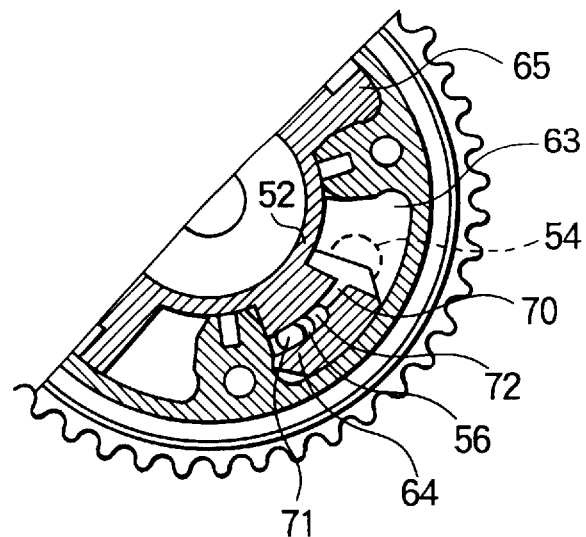
FIG. 19 is a fragmentary sectional view for illustrating displacement of a slide plate constituting a part of the variable valve timing mechanism shown in FIG. 18.
Figure 20:
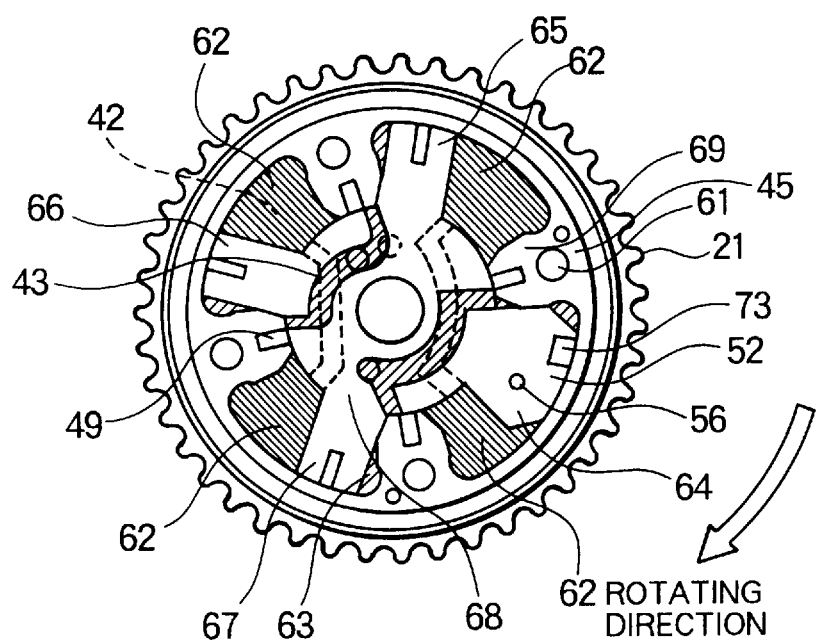
FIG. 20 is a sectional view taken along a line Y—Y in FIG. 16 and viewed in the direction indicated by arrows.
Figure 21:
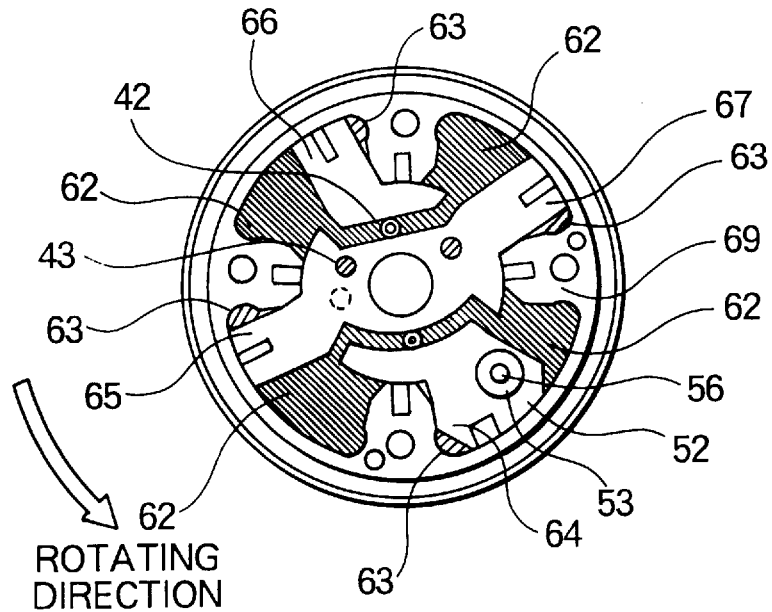
FIG. 21 is a sectional view taken along a line Z—Z in FIG. 16 and viewed in the direction indicated by arrows.
Figure 22:
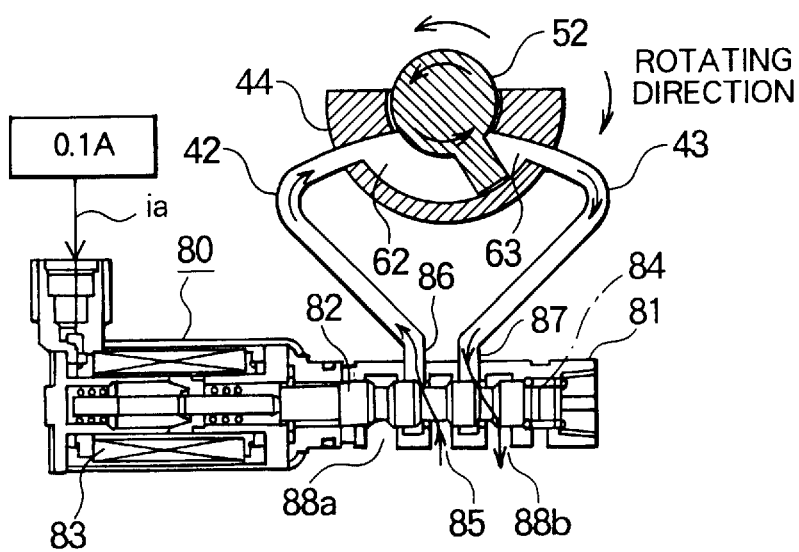
FIG. 22 is a view for illustrating operation of an oil control valve of the valve timing control system when a control current therefor is smaller than a reference value.
Figure 23:
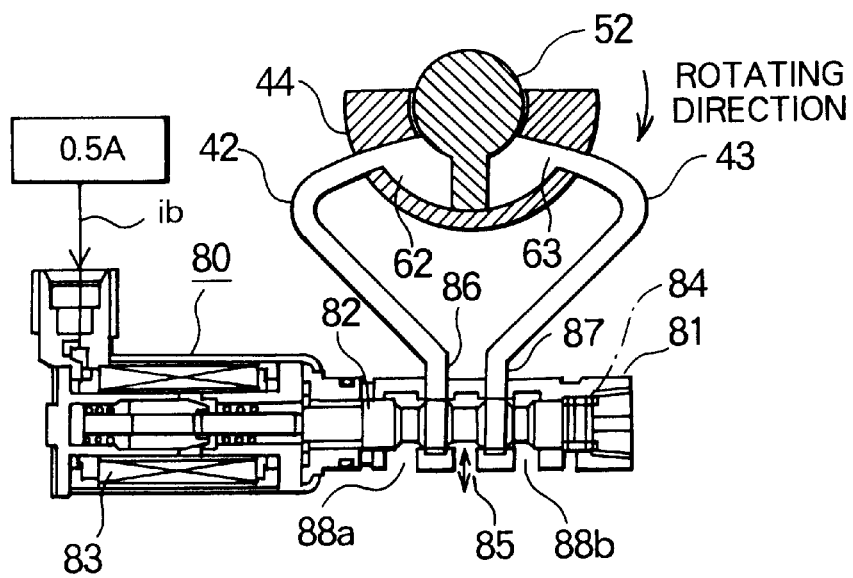
FIG. 23 is a view for illustrating operation of the oil control valve when the control current therefor is equal to the reference value.
Figure 24:
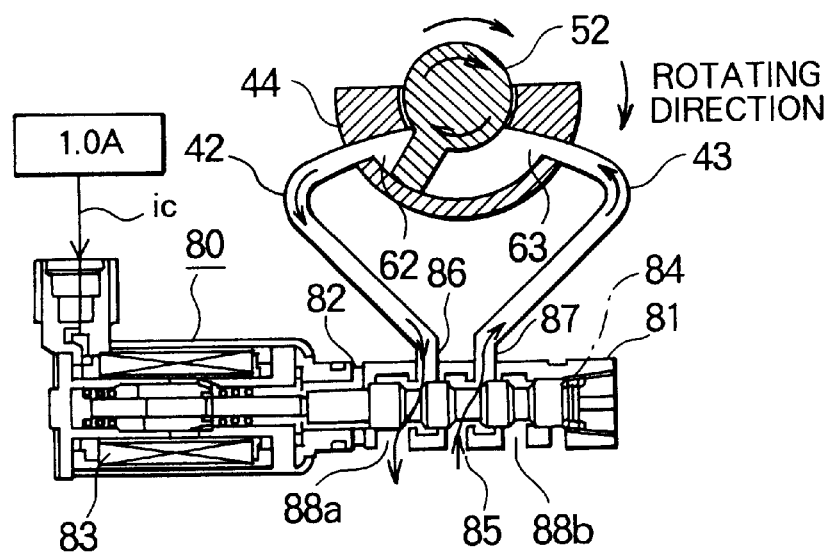
FIG. 24 is a view for illustrating operation of the oil control valve when the control current therefor is greater than the reference value.
Figure 25:
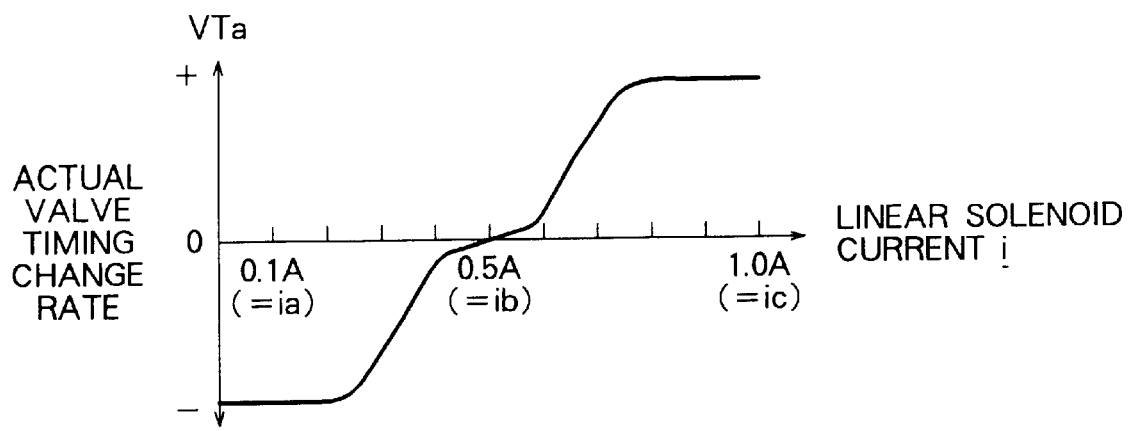
FIG. 25 is a characteristic diagram for illustrating a relation between a control current flowing through a linear solenoid of the oil control valve and rate of change in an actual valve timing.
Figure 26:
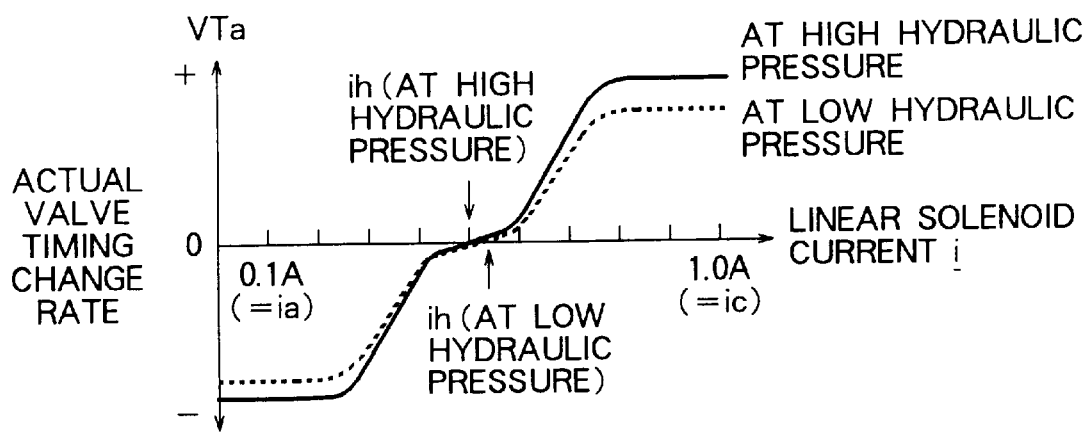
FIG. 26 is a characteristic diagram for illustrating variations in a relation between the control current flowing through the linear solenoid of the oil control valve and the rate of change in the actual valve timing.
Figure 27:
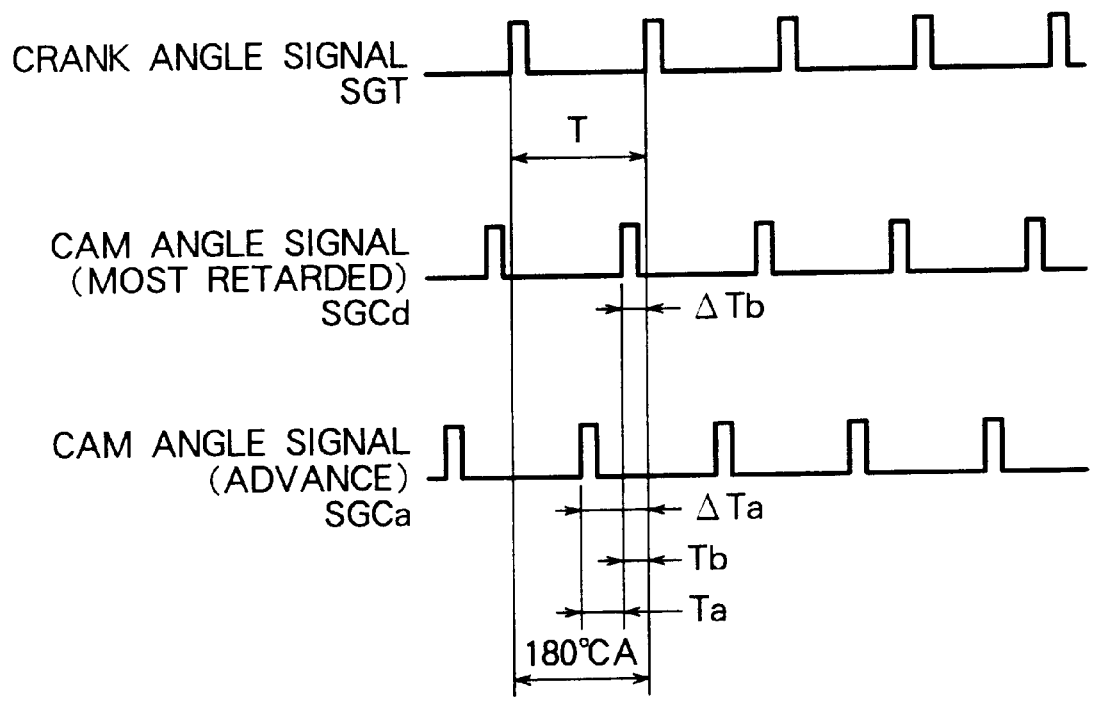
FIG. 27 is a timing chart for illustrating changes of a crank angle signal, a cam angle signal and the actual valve timing as a function of time lapse.
Figure 28:
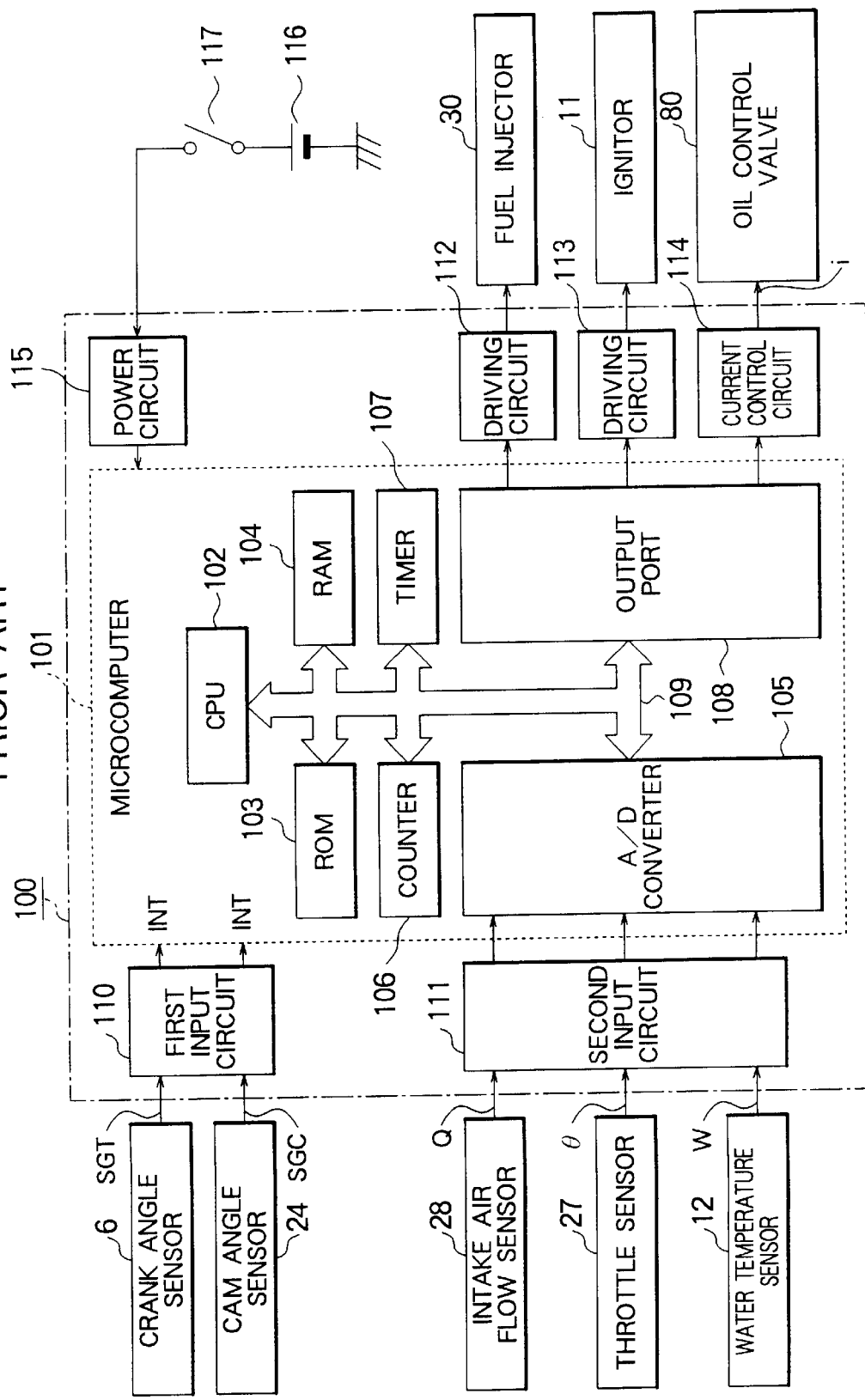
FIG. 28 is a block diagram showing schematically a structure of an electronic control unit employed in the conventional valve timing control system.

In general, the response characteristic of the intake valve 17 as well as that of the exhaust valve 18 is such that about 100 msec is taken for the valves 17 and 18 to respond in reality to a change of the desired valve timing To (see FIG. 15). Accordingly, the predetermined time period TW mentioned above should preferably be set to a time period which is equivalent to ca. 100 msec. in terms of the crank angle.

The number of times the phase difference between the crank angle signal SGT and the cam angle signal SGC has been measured can be determined by counting the number of times of the crank angle period is detected, whereby lapse of the predetermined time period TW can be discriminatively decided as well.

Thus, detection error ascribable to elongation/contraction of the timing belt 23 and variation of the engine rotation number can be eliminated, whereby the most retarded valve timing Td can be essentially set with higher reliability when compared with the case where the updating of the learned value LRN is executed immediately upon decision that the detected value Td1 indicates the retard state.

Embodiment 9

In the valve timing control system according to the eighth embodiment of the invention, the detected value is compared with the precedently learned value without taking into consideration the predetermined value TH in the step S4 of deciding the retard indicated by the detected value Td1. However, such arrangement can also be adopted in which the retard state indicated by the detected value is decided by taking into account the predetermined value TH mentioned hereinbefore.

Figure 10:
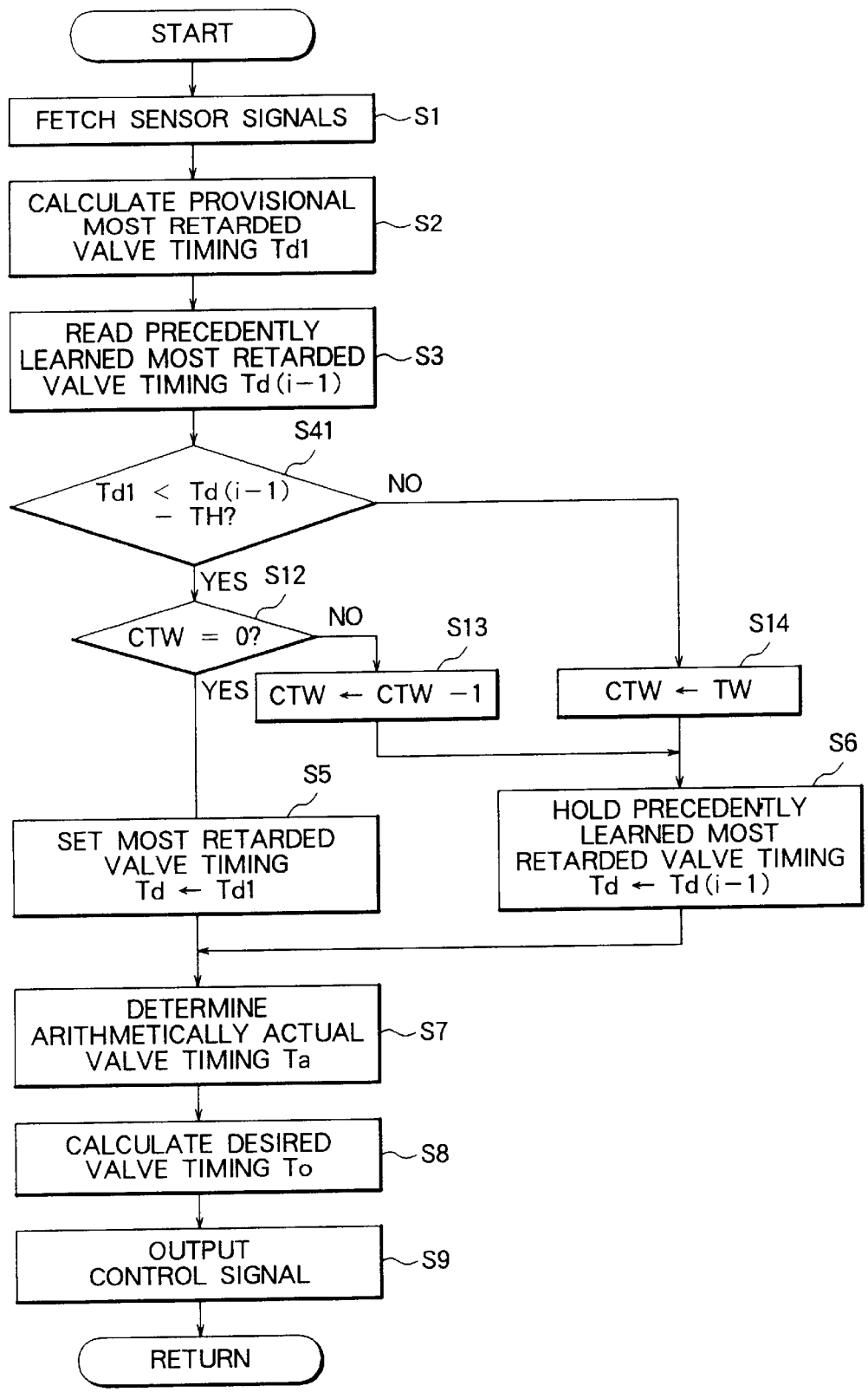
FIG. 10 is a flow chart for illustrating a learning operation in the valve timing control system according to a ninth embodiment of the present invention.

FIG. 10 is a flow chart for illustrating learning operation or procedure according to a ninth embodiment of the present invention which is designed for deciding the retard state indicated by the detected value by taking into consideration the predetermined value TH. The instant embodiment differs from the eighth embodiment (FIG. 9) described above in respect to the step S41.

In the valve timing control system according to the ninth embodiment, the processing proceeds to a step S12 when decision is made in the step S41 shown in FIG. 10 that the retard indicated by the detected value Td1 is smaller than that of the preceding most retarded valve timing Td(i−1) minus the predetermined value TH or Td1<Td(i−1)−TH (i.e., when the decision step S41 results in affirmation "YES"). On the other hand, when it is decided in the step S41 that the detected value Td1 is not smaller than the preceding most retarded valve timing Td(i−1) minus the predetermined value TH or Td1≧Td(i−1)−TH (i.e., when the decision step S41 results in negation "NO"), the processing proceeds to the step S13 where the processing procedure described previously is executed.

As the result of this, the retard state indicated by the detected value Td1 can be decided by taking into consideration the retard quantity given by the predetermined value TH (crank angle of ca. two degrees) while the update processing of the most retard valve timing Td is executed after the retard state indicated by the detected value Td1 has been continued for the predetermined time period TW.

In this manner, according to the teachings of the invention incarnated in the ninth embodiment thereof, only when the state in which the retard indicated by the detected value Td1 is not smaller than the predetermined value TH has continued for the predetermined time period TW, the detected value Td1 is reflected in the leaned value. Thus, the detection errors due to the elongation/contraction of the timing belt 23 and variation of the engine rotation number (rpm) can further be suppressed, whereby the most retarded valve timing Td can be set with higher reliability.

Embodiment 10

In the valve timing control system according to the ninth embodiment of the invention, the most retarded valve timing Td is updated without considering the reflection ratio KT in the step S5 of updating the learned value. However, such arrangement can equally be adopted in which the learned value is updated by taking into account the reflection ratio KT mentioned hereinbefore in conjunction with the third embodiment of the invention.

Figure 11:
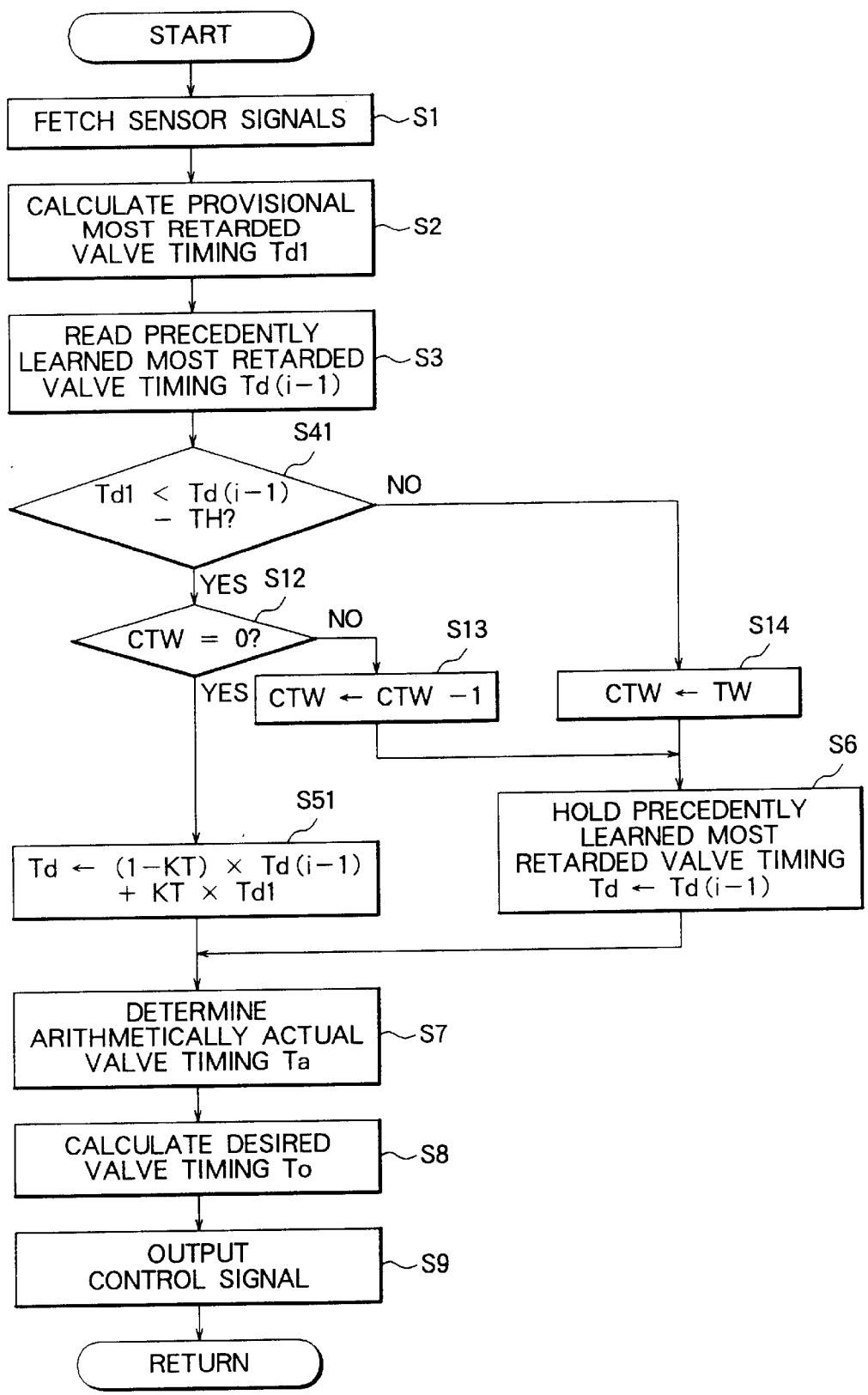
FIG. 11 is a flow chart for illustrating a learning operation in the valve timing control system according to a tenth embodiment of the present invention.

FIG. 11 is a flow chart for illustrating learning operation of the valve timing control system according to a tenth embodiment of the present invention which is designed for updating the learned value by taking into account the reflection ratio KT. The instant embodiment differs from the ninth embodiment (FIG. 10) described above in respect to a step S51. Parenthetically, the step S41 shown in FIG. 11 can be replaced by the step S4 shown in FIG. 9.

In the valve timing control system according to the tenth embodiment, the processing proceeds to the step S51 when it is decided in a step S12 shown in FIG. 11 that the update wait timer value CTW is equal to "0" (zero) (i.e., when the decision step S12 results in "YES"). In the step S51, the learning means 206 determines arithmetically the most retarded valve timing Td by using the reflection ratio KT (KT≦1) in accordance with the expression (3) mentioned hereinbefore.

Thus, the detection errors ascribable to the variation of the engine rotation number (rpm) can be suppressed more effectively, whereby the most retarded valve timing Td can be set with higher reliability.

Embodiment 11

In the valve timing control system according to the tenth embodiment of the invention, it is presumed that the reflection ratio KT is a fixed value. However, the reflection ratio KT may be set variably in consideration of the update frequency record CLTD defined previously (in conjunction with the fifth embodiment of the invention).

Figure 12:
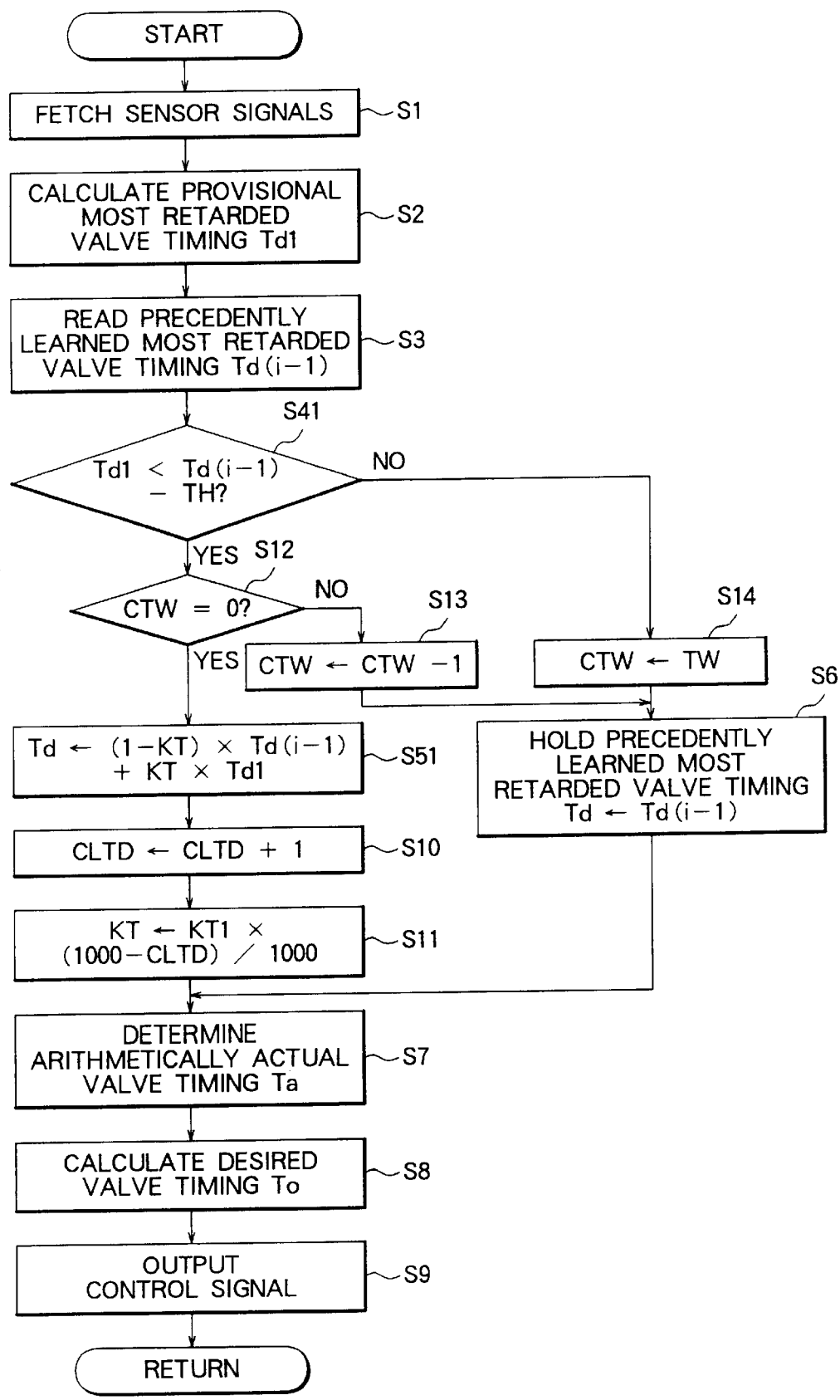
FIG. 12 is a flow chart for illustrating a learning operation in the valve timing control system according to an eleventh embodiment of the present invention.

FIG. 12 is a flow chart for illustrating learning operation according to an eleventh embodiment of the present invention, in which the reflection ratio KT is set variably by taking into account the update frequency record CLTD.

As can be seen in FIG. 12, the instant embodiment differs from the tenth embodiment described above by reference to FIG. 11 only in that steps S10 and S11 are additionally provided in succession to the step S51. Further, it should be added that the step S41 shown in FIG. 12 may be replaced by the step S4 shown in FIG. 9.

Referring to FIG. 12, whenever the learning means 206 updates the learned value in the step S51, the processing proceeds to the step S10 where the update frequency record (the number of times the learned value has been updated) CLTD is determined. Subsequently, the reflection ratio KT is set variably in the step S11.

At this juncture, it should be noted that the maximum value KT1 of the reflection ratio KT is set to ca. "0.8" and that the reflection ratio KT is decremented to a smaller value as the update frequency record CLTD of the learned value LRN increases, as described hereinbefore (refer to FIG. 7).

In this way, when updating of the learned value is executed at high frequency, the reflection ratio KT is decreased. Thus, the detection errors due to variation of the engine rotation number and the like can be eliminated more positively, which enables the most retarded valve timing Td to be set with high reliability.

Embodiment 12

In the valve timing control system according to the eleventh embodiment of the invention, dispersion of the detected value Td1 is not considered. However, such arrangement is equally conceivable in which the reflection ratio KT is set variably by taking into account the dispersion of the detected value Td1.

Figure 13:
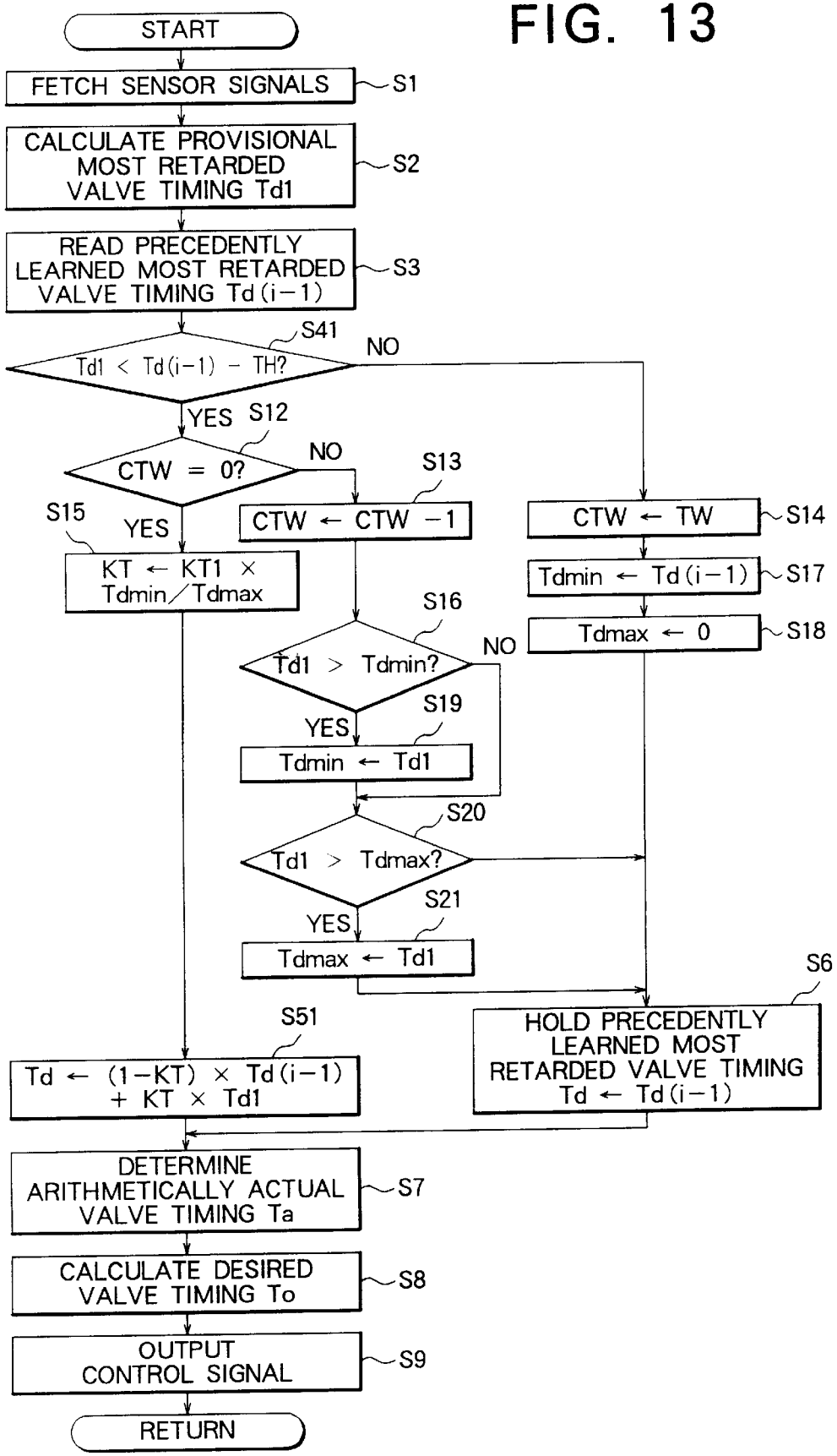
FIG. 13 is a flow chart for illustrating a learning operation in the valve timing control system according to a twelfth embodiment of the present invention.

FIG. 13 is a flow chart for illustrating learning operation in the system according to a twelfth embodiment of the present invention, in which the reflection ratio KT is set variably in dependence on dispersion of the detected value Td1.

Referring to FIG. 13, the instant embodiment differs from the tenth embodiment described previously by reference to FIG. 11 only in the respect that steps S15 to S21 are additionally provided in succession to the step S41 and the steps S12, S13 and S14. Parenthetically, the step S41 shown in FIG. 13 may be replaced by the step S4 shown in FIG. 9.

The learning means 206 is so designed as to set variably the reflection ratio KT in dependence on the dispersion of the actual valve timing Ta in the predetermined time period TW such that the reflection ratio KT is set to a smaller value as the dispersion increases.

In the following description, it is assumed, by way of example, that a maximum ratio (Tdmin/Tdmax) of a lower limit value Tdmin of the detected value Td1 to an upper limit value Tdmax thereof is used as a parameter indicating the dispersion of the detected value Td1.

At first, it is decided in the step S12 shown in FIG. 13 whether or not the update wait timer value CTW is equal to zero (CTW=0). When the decision step S12 results in affirmation "YES", the processing proceeds to the step S15 before executing the learned value update processing step S51. In the step S15, the reflection ratio KT is set on the basis of the maximum value KT1 of the reflection ratio KT and the maximum ratio (=Tdmin/Tdmax) of the detected value Td1 in accordance with the following expression (5):

$$KT = KT1 \times (Tdmin/Tdmax) \quad (5)$$

As is apparent from the above expression, the reflection ratio KT is set to a smaller value as the dispersion in the predetermined time period TW which is indicated by the maximum ratio Tdmin/Tdmax increases, whereby reflection of the detected value Td1 in the learned value LRN can be suppressed or restricted when dispersion of the detected value Td1 is remarkable, indicating that reliability of the detected value Td1 is low.

On the other hand, when it is decided in the step S12 that the predetermined time period TW during which the detected value Td1 continues to indicate the retard state and that the update wait timer value CTW is greater than zero (CTW>0) (i.e., when the decision step S12 results in negation "NO"), the learning means 206 decrements the update wait timer value CTW in the step S13. Thereafter, the processing proceeds to the step S16 where decision is made whether or not the detected value Td1 retards beyond the lower limit value Tdmin (i.e., whether or not Td1<Tdmin).

When the detected value Td1 does not indicate the retard state and when the update wait timer value CTW is reset to the predetermined time period TW in the step S14, the learning means 206 executes the steps S17 and S18 in precedence to the step S6 of holding the learned value.

In other words, the preceding most retarded valve timing Td(i−1) is set as the lower limit value Tdmin in the step S17, and the upper limit value Tdmax is cleared to "0" (zero) in the step S18, whereon the processing proceeds to the step S6.

When it is decided in the step S16 that Td1<Tdmin, i.e., when the decision step S16 results in "YES", the detected value Td1 is updated for registration as the lower limit value Tdmin in the step S19, whereon the processing proceeds to the step S20.

The lower limit value Tdmin updated in the step S19 is used for the arithmetic determination of the reflection ratio KT in accordance with the expression (5) in the step S15 after lapse of the predetermined time period TW.

Further, when it is decided in the step S16 that Td1≧Tdmin, i.e., when decision step S16 results in "NO", the processing proceeds to the step S20 without executing the step S19. In the step S20, decision is made whether or not the detected value Td1 indicates retard which is short of the upper limit value Tdmax (i.e., Td1>Tdmax), representing that the detected timing advances when compared with the upper limit value Tdmax.

When it is decided in the step S20 that Td1>Tdmax, i.e., when decision step S20 results in "YES", the detected value Td1 is updated for registration as the upper limit value Tdmax in the step S21, whereon the processing proceeds to the step S6.

On the contrary, when it is decided in the step S20 that Td1≦Tdmax, i.e., when decision step S20 results in "NO", the processing proceeds straightforwardly to the step s6.

In this conjunction, it is to be noted that since the upper limit value Tdmax is initially cleared to "0" (zero) in the step S18, the processing proceeds first to the step S21 without fail, where the upper limit value is updated over the predetermined time period TW.

The upper limit value Tdmax updated in the step S21 is used for the arithmetic operation for setting the reflection ratio KT in accordance with the expression (5) in the step S15 after lapse of the predetermined time period TW.

As will now be appreciated, the reflection ratio KT is set to the maximum value KT1 (e.g. "0.8") when the dispersion of the detected value Td1 is practically zero, while the reflection ratio KT is reduced as the dispersion of the detected value Td1 increases.

Thus, when the dispersion of the detected value Td1 varies remarkably to such extent that high reliability can not be ensured, reflection of the detected value Td1 in the learned value LRN can be suppressed, whereby the detection errors due to variation of the engine rotation number is excluded without fail, and at the same time the most retarded valve timing Td ensuring high reliability can be set.

Embodiment 13

In the valve timing control system according to the twelfth embodiment of the invention, the maximum ratio (=Tdmin/Tdmax) is used as the parameter indicating the dispersion of the detected value Td1. However, a maximum difference or deviation (=Tdmax−Tdmin) of the detected value Td1 may be used, substantially to the same effect.

Besides, although the reflection ratio KT is set variably by resorting to the arithmetic operation in accordance with the expression (5), values of the reflection ratio KT corresponding to those of the dispersion may be determined previously and the relations therebetween may be stored in the memory in the form of a map data table with the values of dispersion being used as the index.

Embodiment 14

In the valve timing control system according to the twelfth embodiment of the invention, the reflection ratio KT is set variably in dependence on the dispersion of the detected value Td1 in the predetermined time period TW. However, such arrangement can also be adopted in which the reflection ratio KT is set variably in dependence on the timing deviation or difference between the detected value Td1 and the learned value LRN (i.e., the preceding most retarded valve timing Td(i−1)) in the predetermined time period TW.

Figure 14:
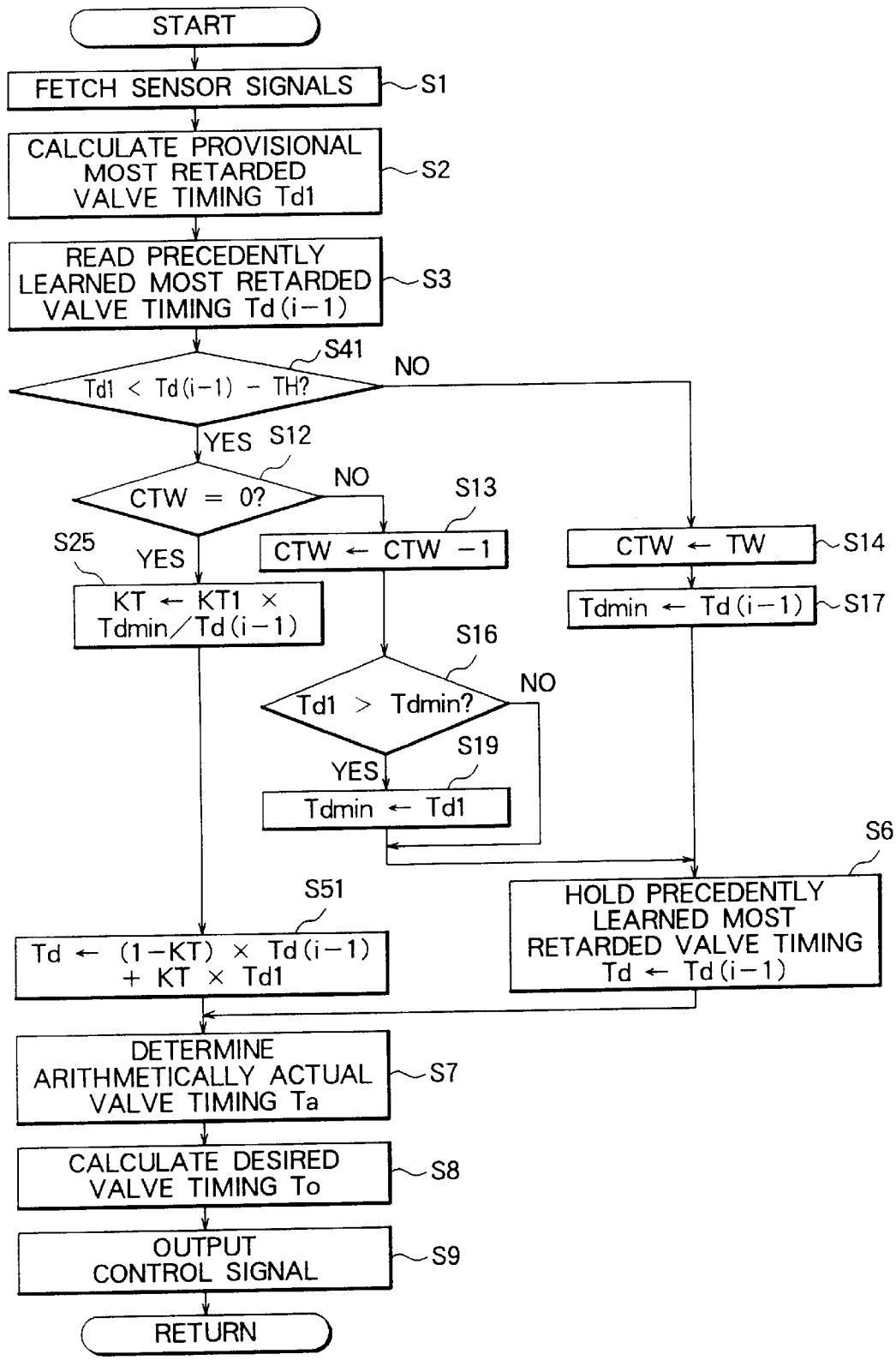
FIG. 14 is a flow chart for illustrating a learning operation in the valve timing control system according to a fourteenth embodiment of the present invention.

FIG. 14 is a flow chart for illustrating learning operation according to a fourteenth embodiment of the present invention, in which the reflection ratio KT is set variably in dependence on the above-mentioned difference or deviation of timing (hereinafter referred to as the timing deviation).

As can be seen from FIG. 14, the instant embodiment differs from the twelfth embodiment described previously by reference to FIG. 13 only in the respect that the step S15 is replaced by a step S25 and that the steps S18, S20 and S21 are omitted. Parenthetically, the step S41 shown in FIG. 14 may be replaced by the step S4 shown in FIG. 9.

According to the teachings of the invention incarnated in the instant embodiment, the learning means 206 is so designed or programmed as to set variably the reflection ratio KT in dependence on the timing deviation or difference between the actual valve timing Ta and the learned value LRN in the predetermined time period TW so that the reflection ratio KT assumes a smaller value as the magnitude of the timing deviation increases.

In the description which follows, it is presumed, by way of example, that a timing ratio (=Tdmin/Td(i−1)) of the lower limit value Tdmin of the detected value Td1 to the preceding most retarded valve timing Td(i−1) is employed as a parameter indicating the timing deviation.

At first, when it is decided in the step S12 shown in FIG. 14 that the update wait timer value CTW is equal to zero (i.e., when the decision step S12 results in "YES"), the processing executed by the learning means 206 proceeds to the step S25 in precedence to the leaned value updating step S51 to thereby set variably the reflection ratio KT on the basis of the maximum value KT1 of the reflection ratio KT and the timing ratio (Tdmin/Td(i−1)) in accordance with the following expression (6):

$$KT = KT1 \times (Tdmin/Td(i-1)) \quad (6)$$

In this manner, the reflection ratio KT is set to a smaller value as the timing deviation (the timing ratio) in the predetermined time period or interval TW increases, whereby reflection of the detected value Td1 in the learned value LRN is suppressed when the timing deviation is large, indicating that reliability is rather poor.

On the other hand, when it is decided in the step S12 that the update wait timer value CTW is greater than zero (CTW>0) (i.e., when the decision step S12 results in "NO"), the learning means 206 executes the processings of the steps S13, S16 and S19 mentioned previously, whereon the step S6 of holding the learned value is executed.

Further, when it is decided in the step S41 that Td1≧Td(i−1)−TH (i.e., when the decision step S41 results in negation "NO"), the learning means 206 executes the processing steps S14 and S17 described above, whereon the processing proceeds to the step S6 of holding the learned value.

As will now be appreciated, the reflection ratio KT is set to a maximum value KT1 (e.g. "0.8") when the timing deviation (timing ratio) is practically zero, while being decreased as the timing deviation increases.

Thus, when the timing deviation is large, indicating poor reliability, the reflection of the detected value Td1 in the learned value LRN is suppressed for eliminating the detection error due to variation of the engine rotation number, whereby the most retarded valve timing Td can be set with high reliability.

Embodiment 15

In the valve timing control system according to the fourteenth embodiment of the invention, the timing ratio (=Tdmin/Td(i−1)) is used as the parameter indicating the timing deviation. However, in the valve timing control system according to a fifteenth embodiment of the invention the timing difference (Td(i−1)−Tdmin) between the lower limit value Tdmin for the detected values Td1 and the preceding most retarded valve timing Td(i−1) (or deviation of the former from the latter) is employed as the parameter indicating the timing deviation. With such arrangement, substantially same advantageous effect as that of the fourteenth embodiment can be achieved.

In this conjunction, it should be added that although the reflection ratio KT is set variably by resorting to the arithmetic operation in accordance with the expression (6), the reflection ratios KT corresponding to individual values of the timing ratio may be previously determined and stored in a memory in the form of a map data table with the timing ratio being used as the index.

Embodiment 16

In the valve timing control system according to the fourteenth embodiment of the invention, the reflection ratio KT is set variably in dependence on the magnitude of the timing deviation. According to a sixteenth embodiment of the invention, it is proposed that the reflection ratio KT is set variably in dependence on variation of the timing deviation so that the reflection ratio KT can assume a smaller value as variation of the timing deviation becomes more remarkable.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A valve timing control system for an internal combustion engine, comprising:

an intake valve and an exhaust valve driven in synchronism with rotation of said internal combustion engine for opening/closing an intake passage and an exhaust passage, respectively, which are communicated to a combustion chamber of said internal combustion engine;

engine operation state detecting means for detecting operation states of said internal combustion engine;

desired valve timing arithmetic means for arithmetically determining a desired valve timing for at least one of said intake valve and said exhaust valve in dependence on said engine operation state as detected;

variable valve timing mechanism for changing open/close timing of at least one of said intake valve and said exhaust valve;

actual valve timing detecting means for detecting an actual valve open/close timing of at least one of said intake valve and said exhaust valve;

actual valve timing control means for generating a control quantity for said variable valve timing mechanism so that a timing deviation of said actual valve timing from said desired valve timing becomes zero; and learning means for learning a most retarded valve timing of said actual valve timing as a learned value, wherein said learning means is so arranged as to reflect a detected value of said actual valve timing in said learned value when said actual valve timing is detected at a timing which retards relative to said learned value in the course of operation of said internal combustion engine, and wherein said actual valve timing control means is so arranged as to determine arithmetically said control quantity in dependence on said learned value as a maximum retard reference.

2. A valve timing control system for an internal combustion engine according to claim 1, wherein said leaning means is so designed as to reflect said detected value of said actual valve timing in said learned value when said detected value of said actual valve timing indicates retard which exceeds said learned value by a predetermined value.

3. A valve timing control system for an internal combustion engine according to claim 2, wherein said learning means is so designed as to set said predetermined value to be equivalent to a crank angle of approximately two degrees.

4. A valve timing control system for an internal combustion engine according to claim 1, wherein said learning means is so designed as to modify a detected value of said actual valve timing by multiplying said detected value by a predetermined reflection ratio to thereby reflect said modified detected value in said learned value.

5. A valve timing control system for an internal combustion engine according to claim 4, wherein said learning means is so designed as to set variably said reflection ratio in dependence on a rotation number of said engine such that said reflection ratio assumes a maximum value when said engine rotation number lies within an intermediate-speed range of said engine.

6. A valve timing control system for an internal combustion engine according to claim 5, wherein said intermediate-speed range of said engine rotation number is set to a range of 1500 to 3000 rpm.

7. A valve timing control system for an internal combustion engine according to claim 4, wherein said learning means is so designed as to set variably said reflection ratio in dependence on an update frequency which indicates a number of times said learned value has been updated so that said reflection ratio assumes a smaller value as said update frequency increases.

8. A valve timing control system for an internal combustion engine according to claim 7, wherein said learning means is so designed as to set said reflection ratio to a constant value which is greater than zero, when said update frequency of said learned value becomes greater than a predetermined value inclusive thereof.

9. A valve timing control system for an internal combustion engine according to claim 7, wherein said learning means is so designed as to clear said update frequency when said learned value remains being not updated, to thereby set a number of times said learned value has been updated successively as said update frequency by counting said number of times.

10. A valve timing control system for an internal combustion engine according to claim 1, wherein said learning means is so designed that when a state in which said detected value of said actual valve timing indicates retard greater than that indicated by said learned value has continued for a predetermined time period, the detected value of said actual valve timing is reflected in said learned value.

11. A valve timing control system for an internal combustion engine according to claim 10, wherein said predetermined time period is set to a time period equivalent to approximately 100 msec. in terms of a crank angle.

12. A valve timing control system for an internal combustion engine according to claim 10, wherein said learning means is so designed that when said detected value of said actual valve timing indicates retard which exceeds said learned value by a predetermined value, the detected value of said actual valve timing can be in said learned value.

13. A valve timing control system for an internal combustion engine according to claim 10, wherein said learning means is so designed as to modify a detected value of said actual valve timing by multiplying said detected value by a predetermined reflection ratio to thereby reflect said modified detected value in said learned value.

14. A valve timing control system for an internal combustion engine according to claim 13, wherein said learning means is so designed as to set variably said reflection ratio in dependence on an update frequency indicating a number of times said learned value has been updated so that said reflection ratio assumes a smaller value as said update frequency increases.

15. A valve timing control system for an internal combustion engine according to claim 13, wherein said learning means is so designed as to set variably said reflection ratio in dependence on dispersion of said detected value of said actual valve timing in said predetermined time period such that said reflection ratio assumes a smaller value as said dispersion increases.

16. A valve timing control system for an internal combustion engine according to claim 13, wherein said learning means is so designed as to set variably said reflection ratio in dependence on timing difference between said actual valve timing and said learned value in said predetermined time period.

17. A valve timing control system for an internal combustion engine according to claim 16, wherein said learning means is so designed as to set variably said reflection ratio in dependence on variation of said timing difference in said predetermined time period so that said reflection ratio assumes a smaller value as the variation of said timing difference increases.

18. A valve timing control system for an internal combustion engine according to claim 16, wherein said learning means is so designed as to set variably said reflection ratio in dependence on magnitude of said timing difference in said predetermined time period so that said reflection ratio assumes a smaller value as the magnitude of said timing difference increases.

* * * * *